(12) United States Patent
Watanabe et al.

(10) Patent No.: US 12,454,056 B2
(45) Date of Patent: Oct. 28, 2025

(54) DEVICE, CONTROL DEVICE AND METHOD FOR GENERATING SIGNAL FOR WEAVING MOTION

(71) Applicant: Fanuc Corporation, Yamanashi (JP)

(72) Inventors: Daigo Watanabe, Yamanashi (JP); Tomonori Matsushima, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 83 days.

(21) Appl. No.: 18/574,965

(22) PCT Filed: Aug. 3, 2021

(86) PCT No.: PCT/JP2021/028840
§ 371 (c)(1),
(2) Date: Dec. 28, 2023

(87) PCT Pub. No.: WO2023/012908
PCT Pub. Date: Feb. 9, 2023

(65) Prior Publication Data
US 2024/0351206 A1   Oct. 24, 2024

(51) Int. Cl.
*B25J 9/16* (2006.01)
(52) U.S. Cl.
CPC ............ *B25J 9/1664* (2013.01); *B25J 9/161* (2013.01); *B25J 9/1679* (2013.01)
(58) Field of Classification Search
None
See application file for complete search history.

(56) References Cited

U.S. PATENT DOCUMENTS

| | | | | |
|---|---|---|---|---|
| 2018/0316282 A1* | 11/2018 | Arakawa | ............... | H02N 2/062 |
| 2021/0003535 A1* | 1/2021 | Mine | ...................... | G01N 29/11 |

FOREIGN PATENT DOCUMENTS

| | | |
|---|---|---|
| JP | 03207576 A | 9/1991 |
| JP | 06222817 A | 8/1994 |
| JP | 10235582 A | 9/1998 |

OTHER PUBLICATIONS

International Search Report and Written Opinion for International Application No. PCT/JP2021/028840, dated Oct. 19, 2021, 5 pages.

* cited by examiner

*Primary Examiner* — Adam R Mott
(74) *Attorney, Agent, or Firm* — Buchanan Ingersoll & Rooney PC

(57) ABSTRACT

A device includes: a weaving signal generation unit that generates a weaving signal for causing a robot to swing a tool; a chronological data acquisition unit for acquiring chronological data of the amplitude value of the tool when the robot is caused to execute a weaving motion according to the weaving signal; a frequency characteristic acquisition unit for acquiring a first frequency characteristic of chronological data; a resonance determination unit for determining, on the basis of the first frequency characteristic, whether or not the robot is resonating at the frequency of the weaving signal generated by the weaving signal generation unit; and a correction unit for correcting the weaving signal so as to change frequencies if the robot is determined to be resonating.

13 Claims, 17 Drawing Sheets

Fig. 3
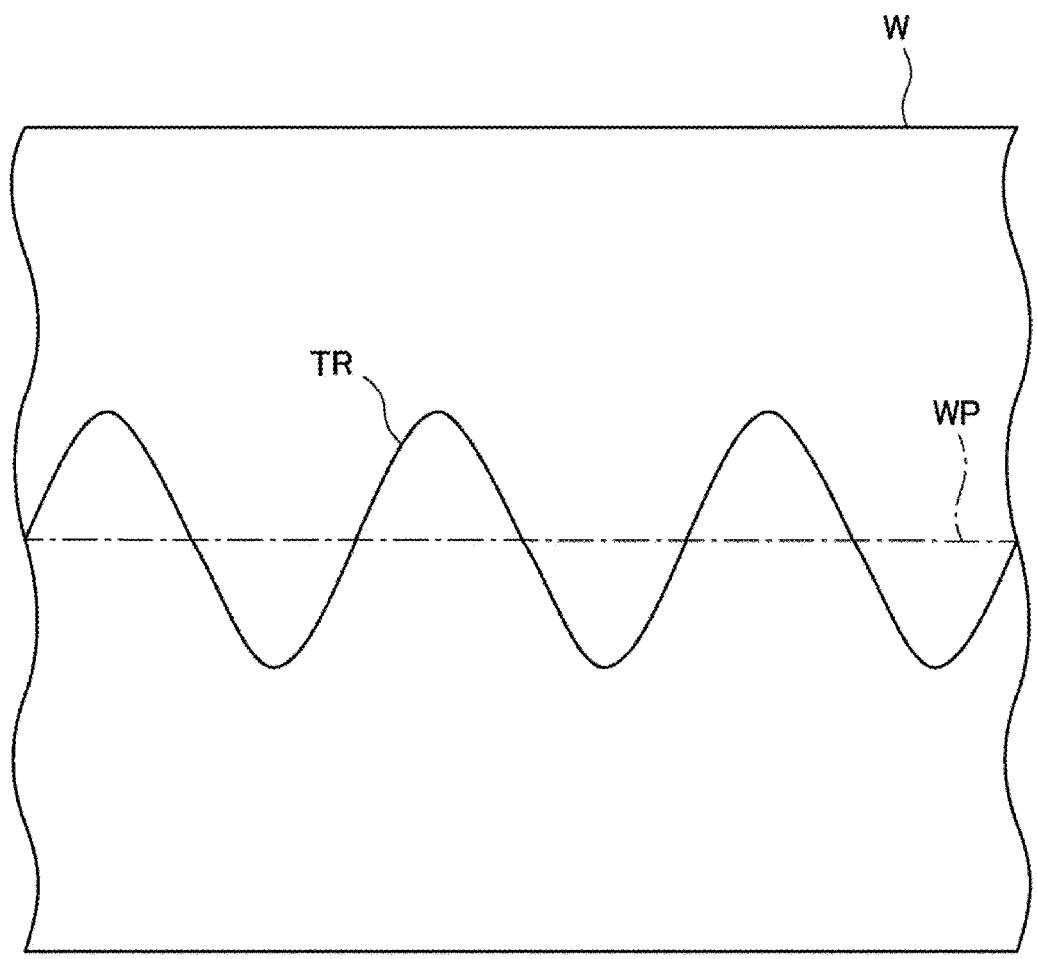
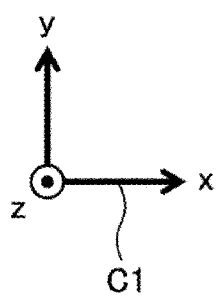

Fig. 16
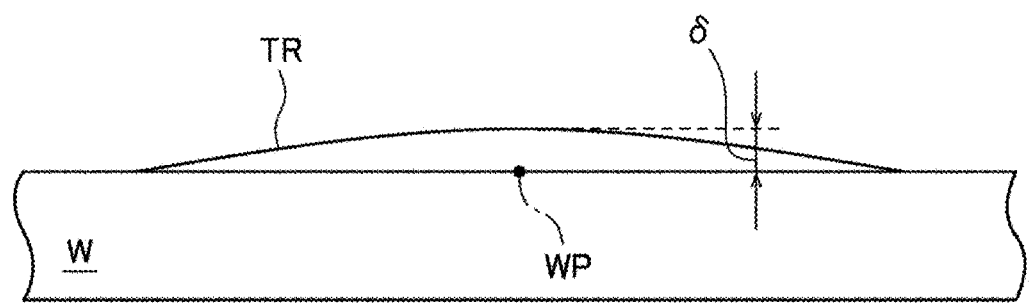
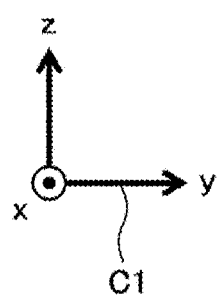

DEVICE, CONTROL DEVICE AND METHOD FOR GENERATING SIGNAL FOR WEAVING MOTION

CROSS REFERENCE TO RELATED APPLICATIONS

This is the U.S. National Phase application of PCT/JP2021/028840, filed Aug. 3, 2021, the disclosures of this application being incorporated herein by reference in its entirety for all purposes.

FIELD OF THE INVENTION

The present disclosure relates to a device for generating signals for a weaving operation and a controller.

BACKGROUND OF THE INVENTION

A device that allows a robot to execute a weaving operation is known (e.g., PTL 1).

PATENT LITERATURE

PTL 1: JP 10-235582 A

SUMMARY OF THE INVENTION

In the related art, when a robot swings a tool during a weaving operation, the robot resonates, and this may degrade work quality.

In one aspect of the present disclosure, a device is provided that generates a signal for a weaving operation to move a tool along a predetermined work path by a robot along with swinging the tool in a direction intersecting with the work path. The device includes: a weaving signal generation unit that generates a weaving signal for causing the robot to swing the tool; a time-series data acquisition unit that acquires time-series data of an amplitude value of the tool in the direction when the robot is caused to execute the weaving operation in accordance with the weaving signal generated by the weaving signal generation unit; a frequency characteristic acquisition unit that acquires a first frequency characteristic of the time-series data acquired by the time-series data acquisition unit; a resonance determination unit that determines whether or not the robot is resonating at a frequency of the weaving signal generated by the weaving signal generation unit, based on the first frequency characteristic acquired by the frequency characteristic acquisition unit; and a correction unit configured to correct the weaving signal so as to change the frequency when the resonance determination unit determines that the robot is resonating.

In another aspect of the present disclosure, a method of generating a signal for a weaving operation to move a tool along a predetermined work path by a robot along with swinging the tool in a direction intersecting with the work path includes: generating, by a processor, a weaving signal for causing the robot to swing the tool; acquiring, by the processor, time-series data of an amplitude value of the tool in the direction when the robot is caused to execute the weaving operation in accordance with the generated weaving signal; acquiring, by the processor, a first frequency characteristic of the acquired time-series data; determining, by the processor, whether or not the robot is resonating at a frequency of the generated weaving signal, based on the acquired first frequency characteristic; and correcting, by the processor, the weaving signal so as to change the frequency when determining that the robot is resonating.

Since the resonance generated when the tool is swung in the weaving operation can be suppressed, the weaving operation can be executed more stably. As a result, the accuracy of a welding work can be enhanced, thereby improving the welding quality.

BRIEF DESCRIPTION OF DRAWINGS

FIG. 3 illustrates a trajectory of a weaving operation executed by the robot illustrated in FIG. 1.

FIG. 16 illustrates another example of a trajectory of the weaving operation.

DETAILED DESCRIPTION OF EMBODIMENTS OF THE INVENTION

Figure 1:
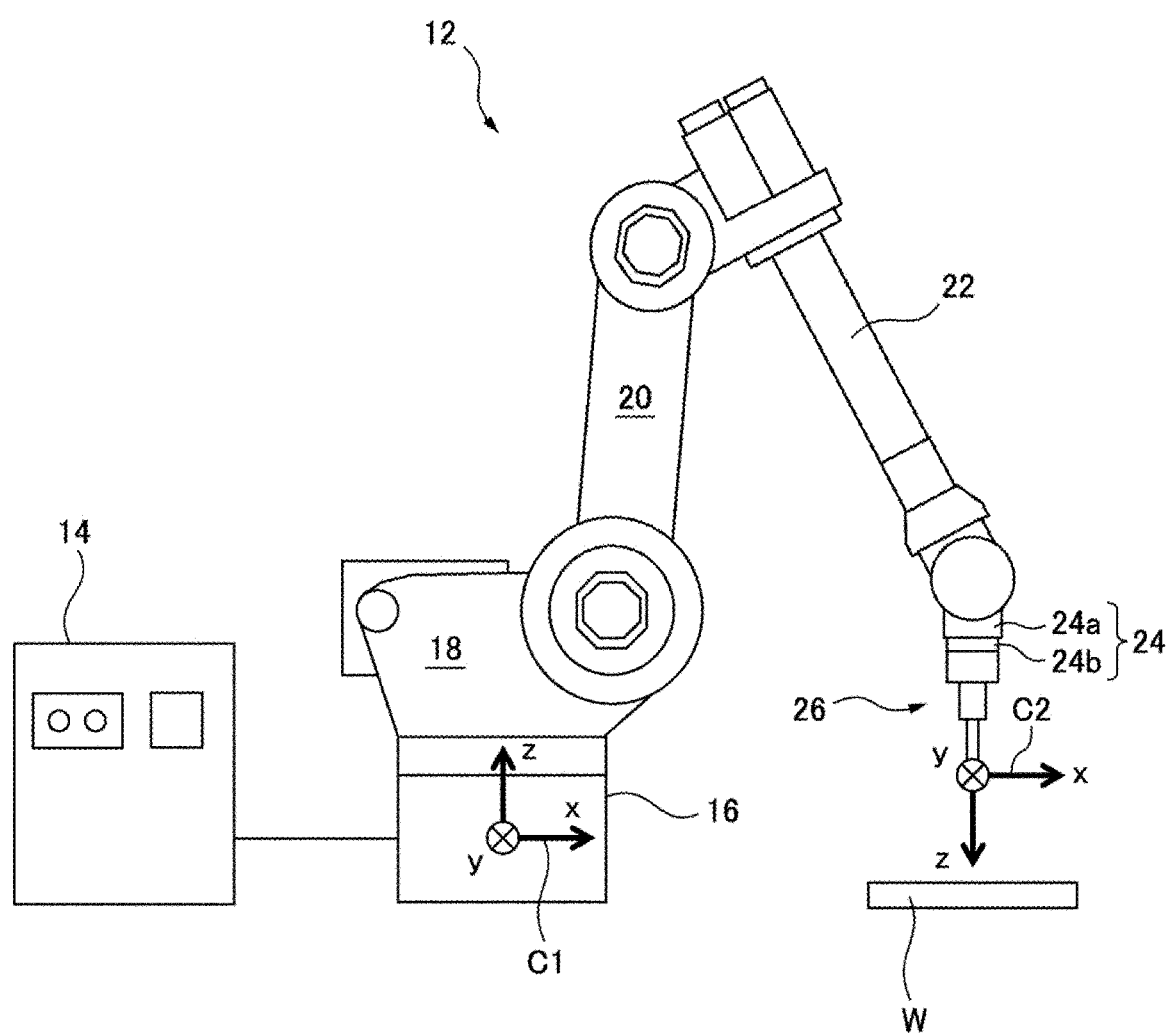
FIG. 1 is a diagram of a robot system according to an embodiment.

Embodiments of the present disclosure are described in detail below based on the drawings. In the various embodiments described below, the same reference signs are given to the same elements and redundant descriptions are omitted. First, a robot system 10 according to an embodiment will be described with reference to FIG. 1 and FIG. 2. The robot system 10 is provided with a robot 12 and a controller 14.

In the present embodiment, the robot 12 executes a welding work on a workpiece W. Specifically, the robot 12 is a vertical articulated robot, and includes a robot base 16, a rotary barrel 18, a lower arm 20, an upper arm 22, a wrist 24, and a tool 26. The robot base 16 is fixed on the floor of a work cell or on an unmanned guided vehicle (AGV). The rotary barrel 18 is provided at the robot base 16 so as to be rotatable around a vertical axis.

The lower arm 20 is provided at the rotary barrel 18 so as to be rotatable around a horizontal axis. The upper arm 22 is rotatably provided at a distal end of the lower arm 20. The wrist 24 includes a wrist base 24a provided at a front end of the upper arm 22 so as to be rotatable around two axes perpendicular to each other, and a wrist flange 24b provided at the wrist base 24a so as to be rotatable.

The tool 26 is detachably attached to the wrist flange 24b. In the present embodiment, the tool 26 is a welding torch, which generates a discharge against the workpiece W in response to a command from the controller 14, and welds the workpiece W by melting the welding wire fed from a wire material feeding device (not illustrated). The tool 26 may be a laser machining head, which radiates a laser beam and melts the welding wire using the laser beam to weld the workpiece W.

Figure 2:
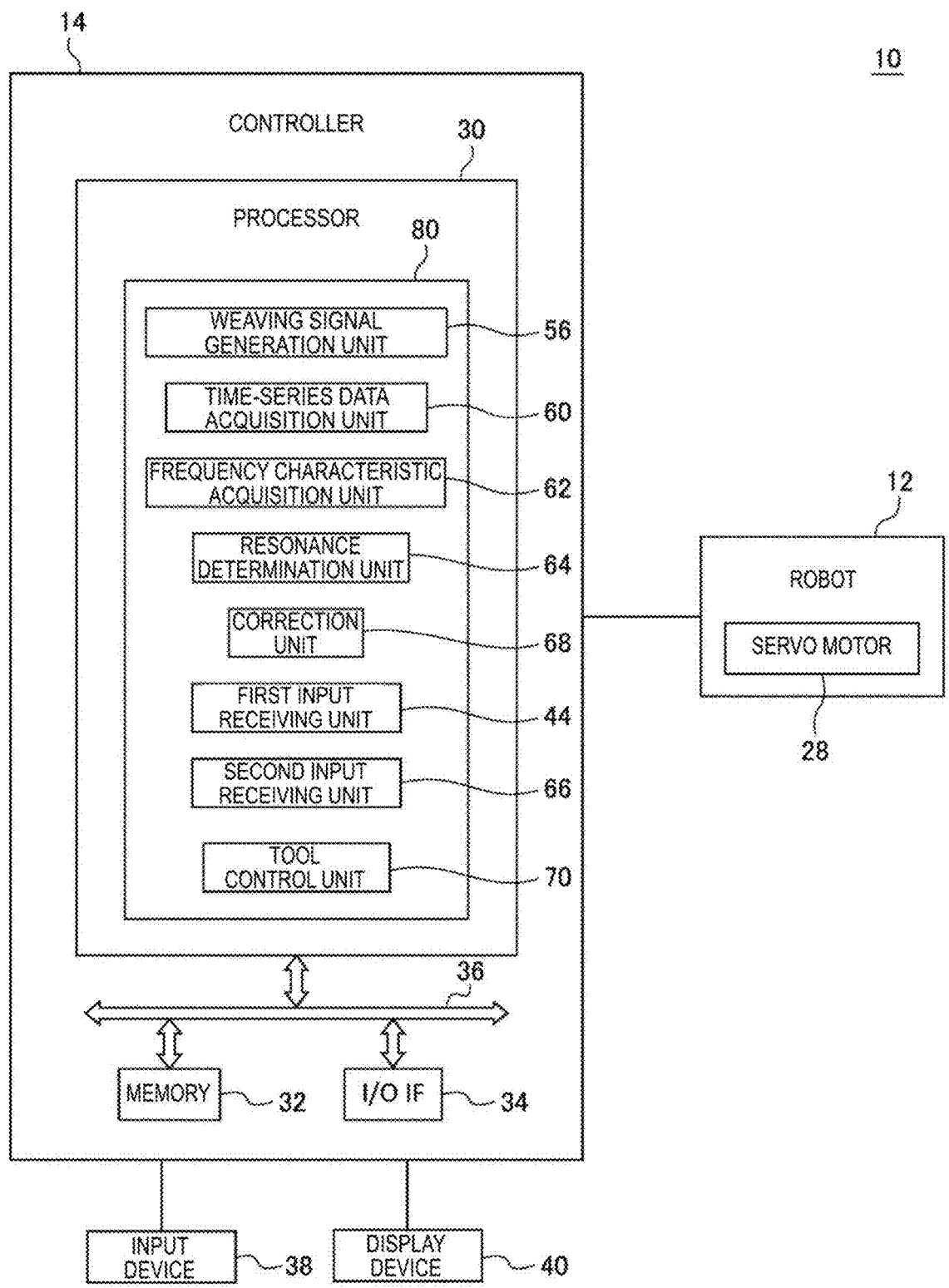
FIG. 2 is a block diagram of the robot system illustrated in FIG. 1.

The robot base 16, the rotary barrel 18, the lower arm 20, the upper arm 22, and the wrist 24 are each provided with a plurality of servo motors 28 (FIG. 2). These servo motors 28 rotate each movable element (i.e., the rotary barrel 18, the lower arm 20, the upper arm 22, the wrist 24, the wrist flange 24b) of the robot 12 in response to a command from the controller 14, thereby moving the tool 26.

The controller 14 controls an operation of the robot 12. As illustrated in FIG. 2, the controller 14 is a computer with a processor 30, a memory 32, and an I/O interface 34. The processor 30 includes a CPU or GPU, and is communicably connected to the memory 32 and the I/O interface 34 via a bus 36, and executes arithmetic processing to execute the weaving operation described later while communicating with these components.

The memory 32 includes a RAM or a ROM, and temporarily or permanently stores various data used in the arithmetic processing executed by the processor 30 and various data generated during the arithmetic processing. The I/O interface 34 includes, for example, an Ethernet® port, a USB port, an optical fiber connector, or an HDMI® terminal, and communicates data in a wired or wireless manner with an external device under a command from the processor 30. In the present embodiment, a servo motor 28 of the robot 12 is communicably connected to the I/O interface 34.

The controller 14 is provided with an input device 38 and a display device 40. The input device 38 includes a keyboard, a mouse, a touch panel, and receives data input from an operator. The display device 40 includes a liquid crystal display or an organic EL display, and displays various data.

The input device 38 and the display device 40 may be communicably connected to the I/O interface 34 in a wired or wireless manner. In addition, the input device 38 and the display device 40 may be provided as elements separate from a housing of the controller 14 or may be integrally incorporated in the housing of the controller 14.

As illustrated in FIG. 1, a robot coordinate system C1 and a tool coordinate system C2 are set for the robot 12. The robot coordinate system C1 is a coordinate system for automatically controlling each movable element of the robot 12. In the present embodiment, the robot coordinate system C1 is set with respect to the robot 12 such that the origin thereof is located at the center of the robot base 16 and the z-axis thereof coincides with the rotary axis of the rotary barrel 18. In the following description, the x-axis plus direction of the robot coordinate system C1 is referred to as rightward, the y-axis plus direction as forward, and the z-axis plus direction as upward.

The tool coordinate system C2 is a coordinate system, which defines the position of the tool 26 in the robot coordinate system C1 and is set with respect to the tool 26. In this article, "position" sometimes means position and orientation. In the present embodiment, the tool coordinate system C2 is set with respect to the tool 26 such that the origin thereof (so-called TCP) is located at a work point of the tool 26 (e.g., the point at which the tool 26 melts a welding wire) and the z-axis direction thereof coincides with the work direction of the tool 26 (e.g., the direction of the center axis of the welding torch tip or the radiation direction of the laser beam).

When moving the tool 26, the processor 30 sets the tool coordinate system C2 in the robot coordinate system C1, and sends a command to each servo motor 28 of the robot 12 to operate each movable element of the robot 12 so that the tool 26 is positioned at the position represented by the set tool coordinate system C2. Thus, the processor 30 positions the tool 26 at a position of choice in the robot coordinate system C1 by the operation of the robot 12.

Next, the weaving operation in which the processor 30 causes the robot 12 to execute during a welding work on the workpiece W, will be described with reference to FIG. 3. The weaving operation is executed to widen a bead formed on the workpiece W during welding on the workpiece W. Specifically, in the weaving operation, the processor 30 moves the tool 26 along a predetermined work path WP using the robot 12 and swings the tool 26 in a direction intersecting the work path WP.

In the example illustrated in FIG. 3, the work path WP is set on the workpiece W to extend linearly in the x-axis direction of the robot coordinate system C1. In this example, the processor 30 moves the tool 26 to the right along the work path WP using the robot 12 and swings the tool 26 in the front-back direction in the weaving operation. As a result, the tool 26 will weld the workpiece W while moving along a wavy trajectory TR with respect to the workpiece W.

Next, the method of generating signals for the weaving operation is described. First, as a preparatory process, the operator operates the input device 38 to input a parameter PR of a weaving signal WS for swinging the tool 26 in the weaving operation. The parameter PR includes an amplitude value A of the weaving signal WS and the frequency $f_0$ of a fundamental harmonic FM of the weaving signal WS. The processor 30 receives an input for the parameter PR through the input device 38. Thus, in the present embodiment, the processor 30 functions as a first input receiving unit 44 (FIG. 2) that receives the input of frequency $f_0$ of the fundamental harmonic FM.

Figure 4:
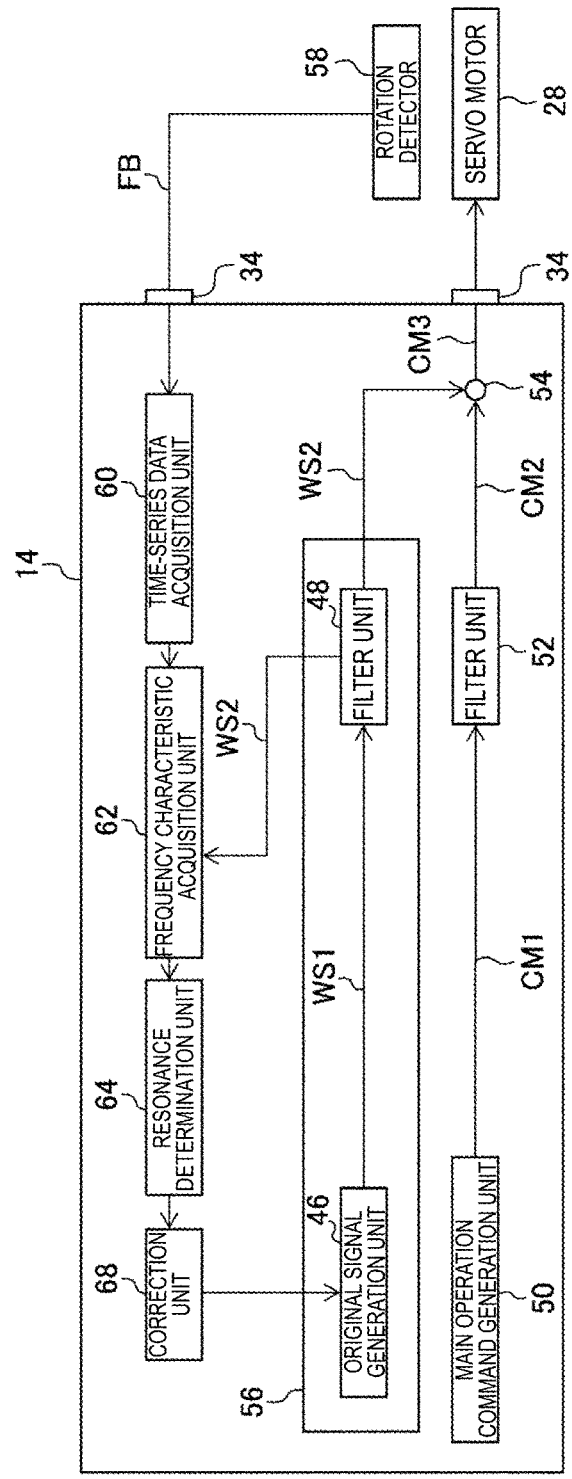
FIG. 4 is a block diagram of a function of generating a weaving operation command in a controller illustrated in FIG. 1.

The processor 30 generates the weaving signal WS in accordance with the parameter PR. FIG. 4 illustrates a block diagram representing the function of generating the weaving signal WS in the controller 14. The processor 30 functions as an original signal generation unit 46 to generate a weaving signal WS1 in accordance with the received parameter PR.

Figure 5:
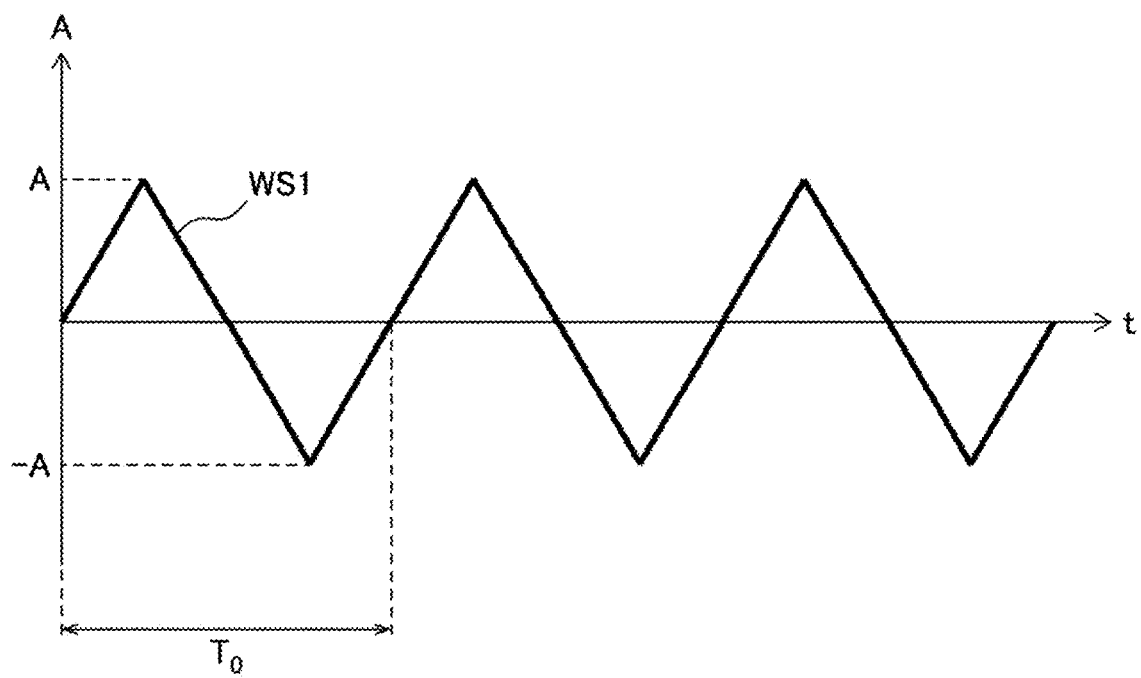
FIG. 5 illustrates a waveform of a first weaving signal according to an embodiment.

An example of the weaving signal WS1 is illustrated in FIG. 5. In FIG. 5, the vertical axis represents the amplitude value A (in other words, distance A from the work path WP), which causes the tool 26 to swing in the front-back direction, and the horizontal axis represents time t. In the example illustrated in FIG. 5, the weaving signal WS1 is a triangular wave with the amplitude value A and frequency $f_0$ (i.e., cycle $T_0=1/f_0$) received from the operator.

The processor 30 then functions as a filter unit 48 and performs filter processing FR1 to remove the high frequency components on the weaving signal WS1 generated by the original signal generation unit 46. In the present embodiment, the filter unit 48 consists of a digital filter (FIR filter or IIR filter). For example, the filter unit 48 executes the filter processing FR1 as a low-pass filter process by performing moving average processing for each filtering period τ on the weaving signal WS1 as a digital signal.

Alternatively, the filter unit 48 may be configured to execute the filter processing FR1 as bandpass filter processing, or as notch filter processing. The filter unit 48 generates a weaving signal WS2 by executing the filter processing FR1 on the weaving signal WS1.

Figure 6:
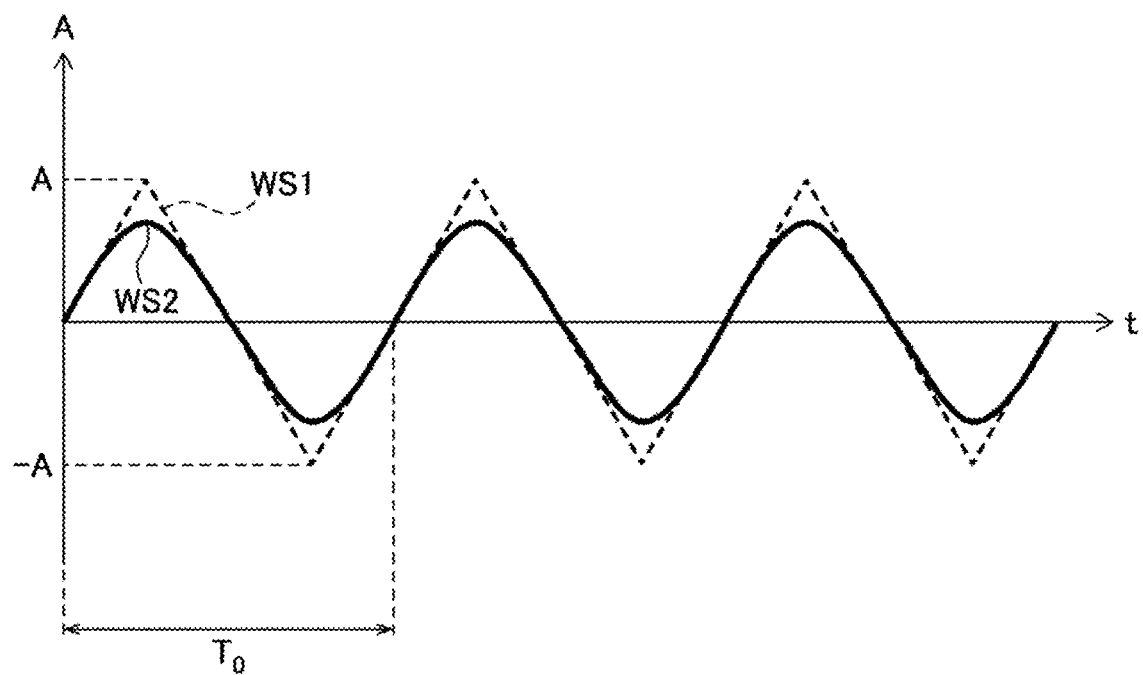
FIG. 6 illustrates a waveform of a second weaving signal generated by filter processing on the first weaving signal illustrated in FIG. 5.

FIG. 6 illustrates an example of the weaving signal WS2. In FIG. 6, for comparison, the weaving signal WS1 is indicated by dotted lines. As illustrated in FIG. 6, as a result of the filter processing FR1, the triangular wave weaving signal WS1 changes to the weaving signal WS2, which resembles a trigonometric waveform (i.e., frequency characteristic FC is changed by the removal of high frequency components).

Thus, in the present embodiment, the processor 30 functions as the original signal generation unit 46 and the filter unit 48 to generate the weaving signals WS1 and WS2. Consequently, the original signal generation unit 46 and the filter unit 48 constitute a weaving signal generation unit 56, which generates the weaving signal WS1 and WS2. In FIG. 6, the weaving signals WS1 and WS2 are represented as analog signals, but in the present embodiment, the weaving signals WS1 and WS2 to be generated by the weaving signal generation unit 56 are digital signals.

Figure 7:
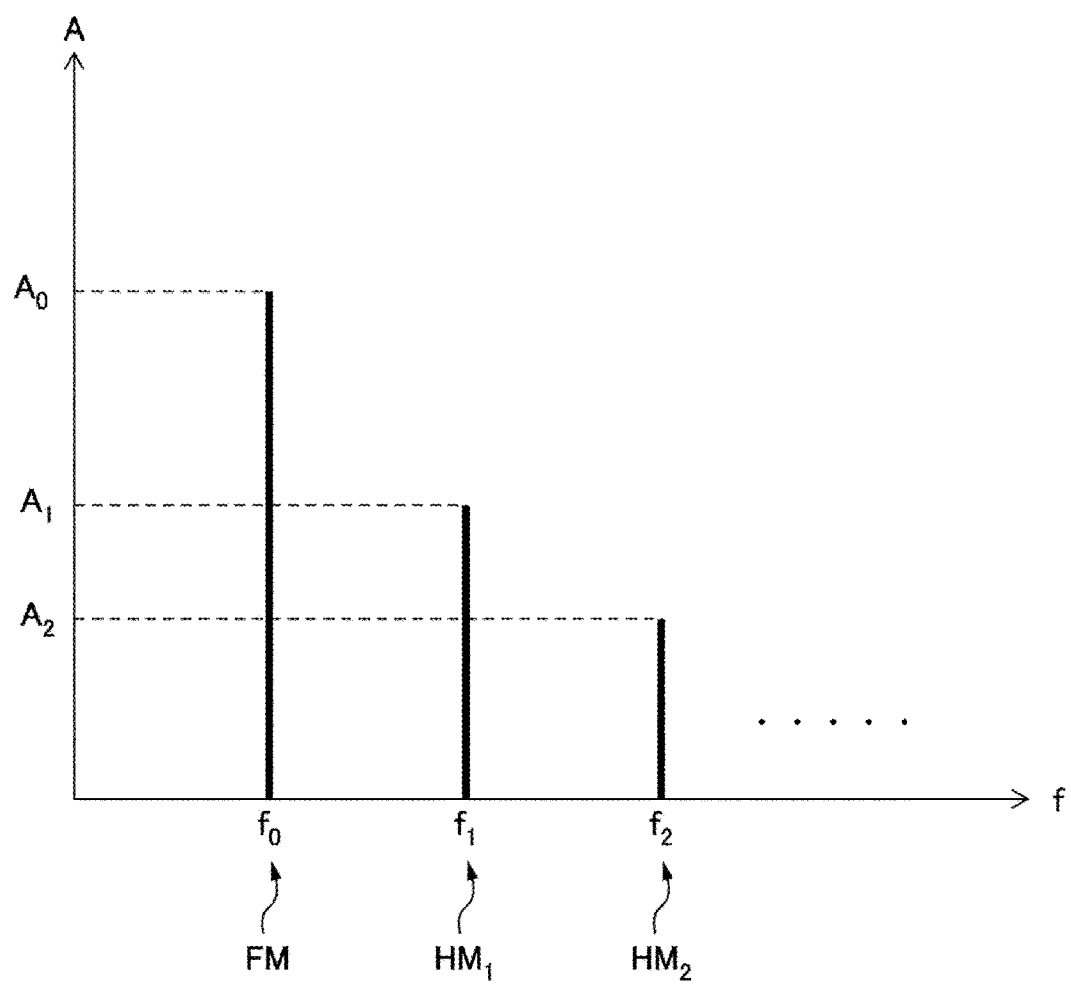
FIG. 7 illustrates a frequency characteristic (frequency spectrum) of the second weaving signal illustrated in FIG. 6.

FIG. 7 illustrates schematically the frequency characteristic $FC_{WS}$ (frequency spectrum) of the weaving signal WS2 generated by the weaving signal generation unit 56. As illustrated in FIG. 7, the weaving signal WS2 has the fundamental harmonic FM at a frequency $f_0$, as well as a higher harmonic $HM_1$ at a frequency $f_1$, a higher harmonic $HM_2$ at a frequency $f_2$ ... and a higher harmonic $HM_n$ at a frequency $f_n$.

The frequency $f_n$ of the higher harmonic $HM_n$ can be, for example, an integer multiple (specifically, an odd multiple) of the frequency $f_0$ of the fundamental harmonic FM. In the example illustrated in FIG. 7, the fundamental harmonic FM has an amplitude $A_0$, the higher harmonic $HM_1$ has an amplitude $A_1$, and the higher harmonic $HM_2$ has an amplitude $A_2$. Thus, the weaving signal WS2 has frequency components (i.e., the fundamental harmonic FM and higher harmonics $HM_n$) of the frequency $f_n$ (n=0, 1, 2, 3 ...).

Again referring to FIG. 2 and FIG. 4, the processor 30 functions as a main operation command generation unit 50 to generate a main operation command CM1 for the robot 12 to move the tool 26 in the direction of the work path WP in the above-described weaving operation. The processor 30 then functions as a filter unit 52 and executes filter processing FR2 on the main operation command CM1 generated by the main operation command generation unit 50.

The filter unit 52 consists of a digital filter similar to the above-described the filter unit 48, and executes the filter processing FR2 for removing high-frequency components on the main operation command CM1. The filter processing FR2 may be the same as or different from the above-described filter processing FR1. The filter unit 52 generates a main operation command CM2 by executing the filter processing FR2 on the main operation command CM1.

The processor 30 then functions as a weaving operation command generation unit 54 and generates a weaving operation command CM3 to cause the robot 12 to execute the weaving operation by applying the weaving signal WS2 to the main operation command CM2. Specifically, the weaving operation command generation unit 54 is an adder that generates the weaving operation command CM3 (=CM2+WS2) by adding the weaving signal WS2 to the main operation command CM2.

The weaving operation command CM3 generated by the weaving operation command generation unit 54 is output to the servo motors 28 of the robot 12 through the I/O interface 34 and a servo amp (not illustrated). In accordance with the weaving operation command CM3, the robot 12 executes the weaving operation and moves the tool 26 along the trajectory TR illustrated in FIG. 3.

The original signal generation unit 46, the main operation command generation unit 50, filter units 48 and 52, and the weaving operation command generation unit 54 can be function modules implemented by a work program PG executed by the processor 30. At least one of the main operation command generation unit 50, filter units 48 and 52, and the weaving operation command generation unit 54 (e.g., filter units 48 and 50), may be implemented in the controller 14 as an analog circuit.

When the robot 12 is caused to execute the weaving operation in accordance with the weaving operation command CM3 generated as described above, the natural frequency of the robot 12 that swings the tool 26 in the front-back direction may coincide with the frequency $f_0$ of the fundamental harmonic FM of the weaving signal WS2 or the frequency $f_n$ of the higher harmonics $HM_n$, described in FIG. 7, so that the robot 12 can resonate.

Figure 8:
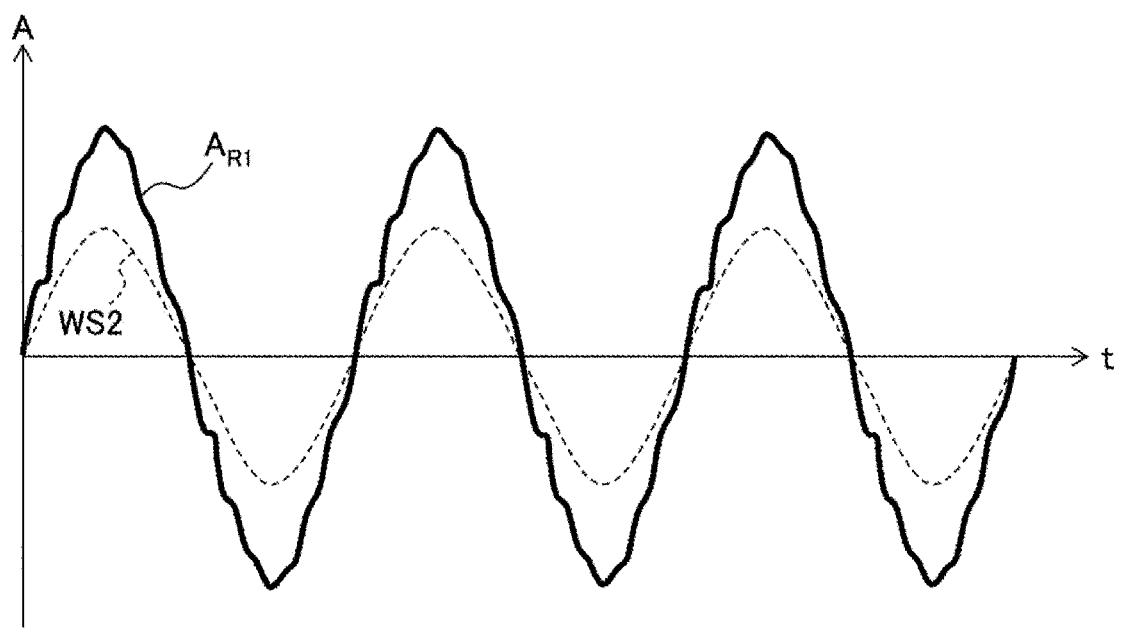
FIG. 8 illustrates a temporal change characteristic of an amplitude value of a tool when a robot resonates at a fundamental harmonic frequency.

FIG. 8 schematically illustrates a temporal change characteristic $A_{R1}$ of the amplitude value A in the front-back direction (i.e., the y-axis direction of the robot coordinate system C1) of the tool 26 when the robot 12 resonates at the frequency $f_0$ of the fundamental harmonic FM. In FIG. 8, for comparison, the temporal change characteristic of the weaving signal WS2 generated by the weaving signal generation unit 56 is represented by dotted lines.

Figure 9:
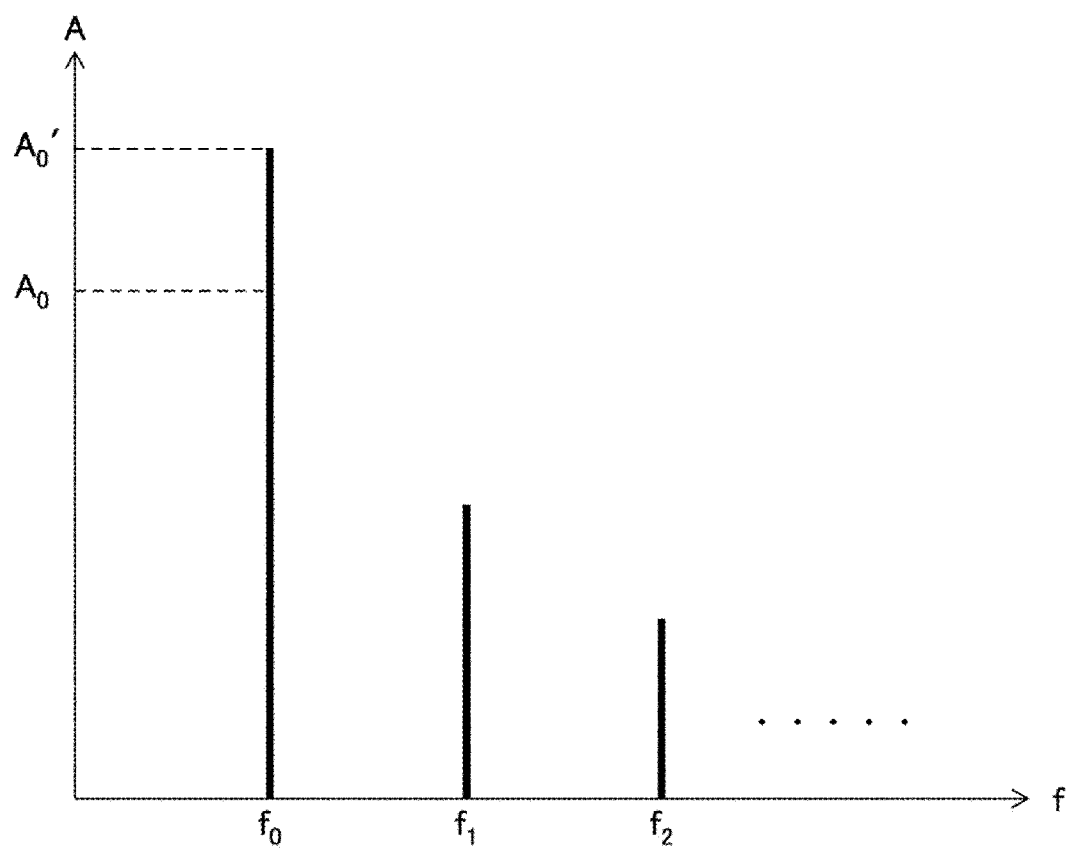
FIG. 9 illustrates a frequency characteristic of the temporal change characteristic illustrated in FIG. 8.

Additionally, FIG. 9 schematically illustrates a frequency characteristic $FC_{R1}$ of the temporal change characteristic $A_{R1}$. As illustrated in FIG. 9, the frequency characteristic $FC_{R1}$ includes the frequency components of the fundamental harmonic FM and higher harmonics $HM_n$, which are included in the original weaving signal WS2, but when the robot 12 resonates at the frequency $f_0$, the amplitude value $A_0'$ of the fundamental harmonic FM becomes larger than an amplitude value $A_0$ of the original weaving signal WS2.

Figure 10:
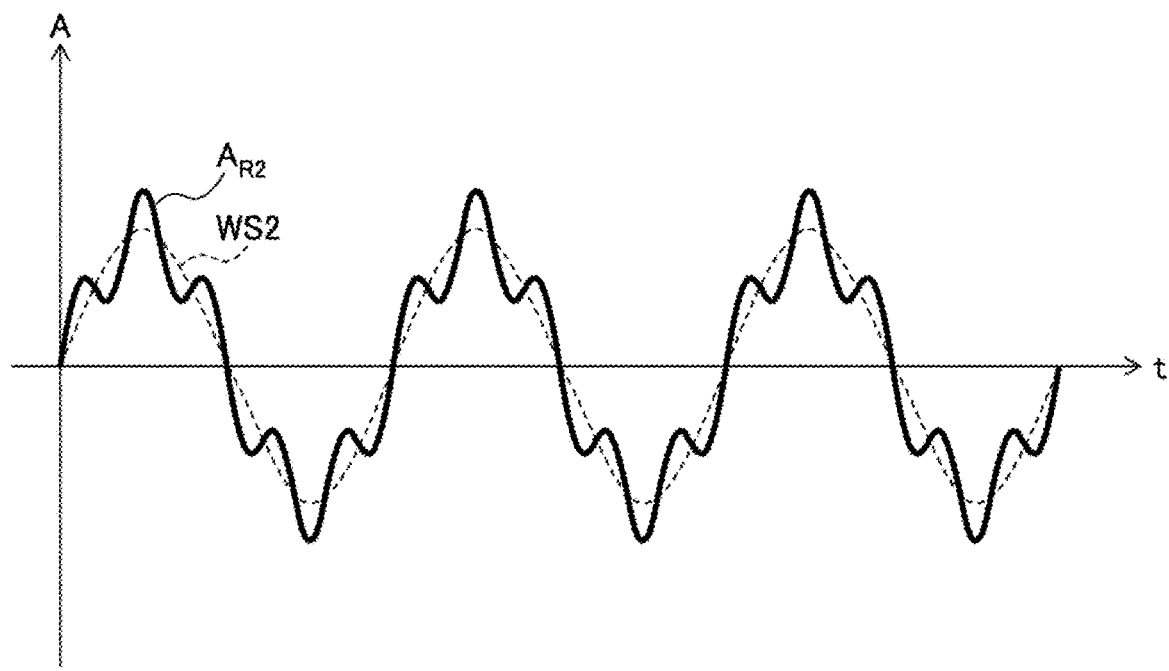
FIG. 10 illustrates a temporal change characteristic of the amplitude value of the tool when the robot resonates at a higher harmonic frequency.
Figure 11:
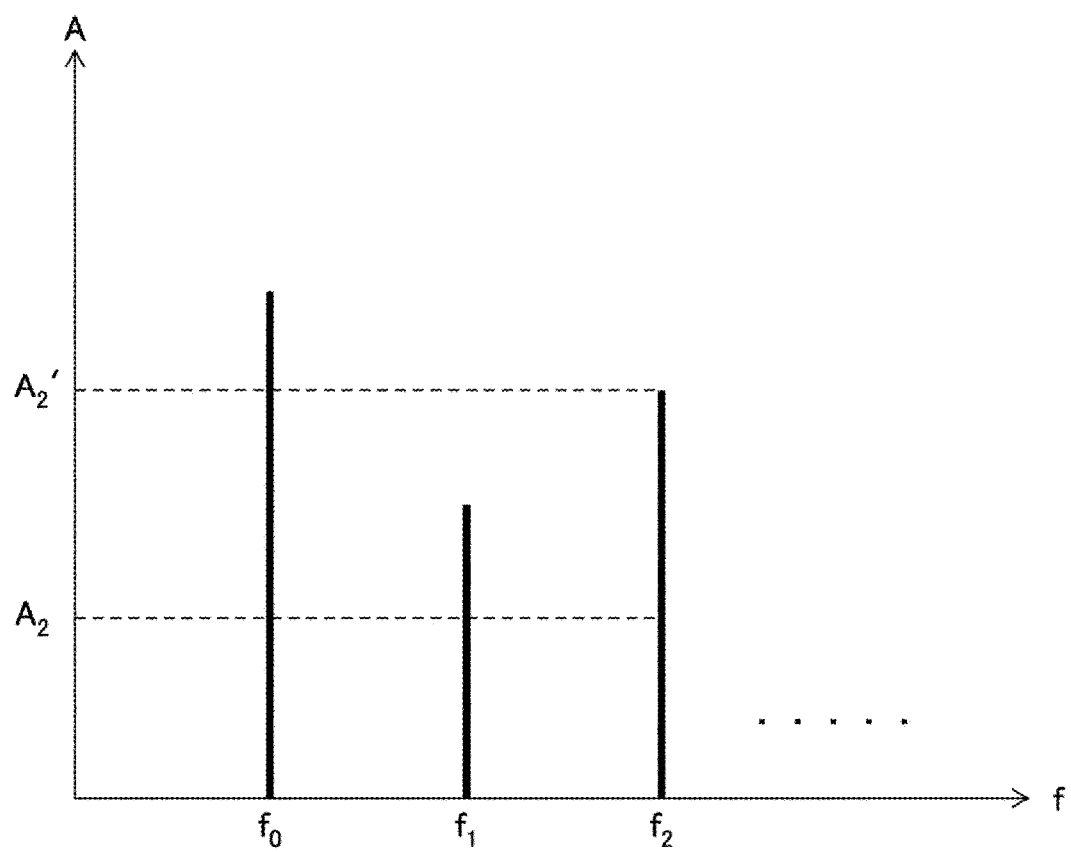
FIG. 11 illustrates a frequency characteristic of the temporal change characteristic illustrated in FIG. 8.

On the other hand, FIG. 10 schematically illustrates the temporal change characteristic $A_{R2}$ of the amplitude value A in the front-back direction of the tool 26 when the robot 12 resonates at the frequency $f_2$ of the higher harmonic HM2. FIG. 11 illustrates a frequency characteristic $FC_{R2}$ of the temporal change characteristic $A_{R2}$ schematically. As illustrated in FIG. 11, when the robot 12 resonates at the frequency $f_2$, the amplitude value $A_2'$ of the higher harmonic $HM_2$ is larger than an amplitude value $A_2$ of the original weaving signal WS2.

When the resonance as illustrated in FIG. 8 to FIG. 11 occurs, the trajectory TR of the tool 26 deviates from the trajectory TR corresponding to the original weaving signal WS2 as illustrated in FIG. 3, and as a result, the accuracy of the welding work decreases. Thus, in the present embodiment, when detecting such resonance, the processor 30 corrects the weaving signal WS so as to suppress the resonance.

The following describes a method of correcting the weaving signal WS. As illustrated in FIG. 4, in the present embodiment, each servo motor 28 is provided with a rotation detector 58 (encoder or Hall element) for detecting the rotation (rotation angle or rotational position) of the servo motor 28.

Each rotation detector 58 continuously (e.g., periodically) detects the rotation of the servo motor 28 while the robot 12 is executing the weaving operation in accordance with the weaving operation command CM3, and sequentially supplies the detected rotation to the controller 14 as position feedback FB. As an example, the rotation detector 58 periodically detects the rotation of the servo motor 28 at a control cycle $T_c$ (e.g., 100 msec) and supplies the detected rotation to the controller 14 as the position feedback FB.

The processor 30 continuously acquires the position feedback FB from the rotation detector 58 through the I/O interface 34. The processor 30 then functions as a time-series data acquisition unit 60 to acquire time-series data TD of the amplitude value A of the tool 26 in the front-back direction based on the acquired position feedback FB.

Specifically, each time when acquiring the position feedback FB from the rotation detector 58, the processor 30 computes the coordinates in the robot coordinate system C1 of the tool 26 (specifically, the origin of the tool coordinate system C2: TCP) by using the position feedback FB and obtains the amplitude value A from the coordinates.

Each time when acquiring the position feedback FB from the rotation detector 58 (i.e., at the control cycle $T_c$), the processor 30 acquires the amplitude value A, which is stored in the memory 32 as the time-series data TD. The thusly obtained time-series data TD is, for example, a digital signal corresponding to the temporal change characteristic $A_{R1}$ in FIG. 8 or the temporal change characteristic $A_{R2}$ in FIG. 10.

The processor 30 then functions as a frequency characteristic acquisition unit 62 to acquire a frequency characteristic $FC_{TD}$ (first frequency characteristic) of the time-series data TD acquired by the time-series data acquisition unit 60. Specifically, the processor 30 converts the acquired time-series data TD into data in the frequency domain through Fourier transform (e.g., FFT) with a predetermined cycle $T_f$, thereby acquiring the frequency characteristic $FC_{TD}$.

The thusly obtained frequency characteristic $FC_{TD}$ corresponds to, for example, the frequency characteristic $FC_{R1}$ illustrated in FIG. 9 or the frequency characteristic $FC_{R2}$ illustrated in FIG. 11. Note that the cycle $T_f$ of the Fourier transform can be freely set by the operator, for example, as a period of integer multiple of the control cycle $T_c$. The operator may enter the cycle $T_f$ as the above-described parameter PR.

The processor 30 then functions as a resonance determination unit 64 to determine whether or not the robot 12 is resonating at the frequency $f_n$ of the weaving signal WS2 generated by the weaving signal generation unit 56, based on the frequency characteristic $FC_{TD}$ acquired by the frequency characteristic acquisition unit 62. Specific examples of methods of determining resonance will be described below.

As one specific example of the resonance determination, the resonance determination unit 64 determines whether or not the robot 12 is resonating by comparing the frequency characteristic $FC_{TD}$ of the time-series data TD acquired by the time-series data acquisition unit 60 with the frequency characteristic $FC_{WS}$ (second frequency characteristic) of the weaving signal WS2 generated by the weaving signal generation unit 56.

Specifically, the processor 30, functioning as the frequency characteristic acquisition unit 62, acquires the frequency characteristic $FC_{WS}$ of the weaving signal WS2 along with the above-described frequency characteristic $FC_{TD}$. For example, the frequency characteristic acquisition unit 62 acquires the weaving signal WS2 generated by the filter unit 48, and converts the weaving signal WS2 into data in the frequency domain through the Fourier transform (e.g., FFT) with a predetermined cycle $T_f$, thereby acquiring the frequency characteristic $FC_{WS}$. Thus, the frequency characteristic acquisition unit 62 acquires the frequency characteristic $FC_{WS}$ as illustrated in FIG. 7.

As an example, the resonance determination unit 64 sets a threshold value $\alpha_n$ in response to an amplitude value $A_n$ (second amplitude value) at the frequency $f_n$ included in the frequency characteristic $FC_{WS}$, based on a frequency characteristic $FC_{WS}$ of the acquired weaving signal WS2. Specifically, the resonance determination unit 64 sets the threshold value $\alpha_0$ as $\alpha_0=\beta \times A_0$ ($\beta$ is a coefficient equal to or more than 1) in response to the amplitude value $A_0$ (FIG. 7) at the frequency $f_0$ of the fundamental harmonic FM included in the acquired frequency characteristic $FC_{WS}$.

On the other hand, the resonance determination unit 64 acquires, from the frequency characteristic $FC_{TD}$ of the acquired time-series data TD, the amplitude value $A_0'$ (first amplitude value) at the frequency $f_0$ of the fundamental harmonic FM included in the frequency characteristic $FC_{TD}$. Then, the resonance determination unit 64 compares the amplitude value $A_0'$ with the threshold value $\alpha_0$, determines whether or not the amplitude value $A_0'$ exceeds the threshold value $\alpha_0$ (i.e., $A_0' > \alpha_0$), and when $A_0' > \alpha_0$, determines that the robot 12 is resonating at the frequency $f_0$ of the fundamental harmonic FM of the weaving signal WS2.

Alternatively, the resonance determination unit 64 may determine the threshold value $\alpha_n$ as $\alpha_n=\beta \times A_n$, in response to the amplitude value $A_n$ (e.g., the amplitude values $A_1$, $A_2$ . . . illustrated in FIG. 7) at the frequency $f_n$ of the higher harmonic $HM_n$ included in the frequency characteristic $FC_{WS}$. Then, the resonance determination unit 64 determines whether or not the amplitude value $A_n'$ (first amplitude value, e.g., the amplitude value $A_2'$ illustrated in FIG. 11) at the frequency $f_n$ of the higher harmonic $HM_n$ included in the frequency characteristic $FC_{TD}$ of the acquired time-series data TD exceeds the threshold value $\alpha_n$ ($A_n' > \alpha_n$). When $A_n' > \alpha_n$, the resonance determination unit 64 determines that the robot 12 is resonating at the frequency $f_n$ of the higher harmonic $HM_n$ of the weaving signal WS2.

Note that the resonance determination unit 64 may set a threshold value $\alpha_n$ for the amplitude value $A_n$ of each of the frequency $f_n$ of the fundamental harmonic FM and higher harmonics $HM_n$ included in the frequency characteristic $FC_{WS}$, which may be compared with the amplitude value $A_n'$ of the frequency $f_n$ of each of the fundamental harmonic FM and higher harmonics $HM_n$ included in the frequency characteristic $FC_{TD}$. The operator may predetermine for which amplitude value $A_n$ of the frequency $f_n$ the threshold value $\alpha_n$ is to be set.

As another example, the resonance determination unit 64 obtains an integrated value INT ($=\int A_n$) of an amplitude value $A_n$ in a predetermined frequency band [$f_i$, $f_j$] (e.g., frequency band of [$f_0$, $f_2$]=$f_0 \leq f \leq f_2$) included in the frequency characteristic $FC_{WS}$, and sets the threshold value $\gamma$ as $\gamma=\beta \times INT$ for the obtained integrated value INT.

On the other hand, the resonance determination unit 64 obtains an integrated value INT'($=\int A_n'$) of the amplitude value $A_n'$ in the frequency band [$f_i$, $f_j$] included in the frequency characteristic $FC_{TD}$. Then, the resonance determination unit 64 determines whether or not the acquired integrated value INT' exceeds the threshold value $\gamma$(INT'>$\gamma$), and when INT'>γ, the robot 12 determines to be resonating at any frequency component of the weaving signal WS2.

As another example, the resonance determination unit 64 obtains a spectral density D (power spectral density, energy spectral density, or the like) of the amplitude value $A_n$ of the frequency characteristic $FC_{WS}$ and sets a threshold value δ as δ=β×D for the spectral density D. On the other hand, the resonance determination unit 64 obtains the spectral density D' of the amplitude value $A_n'$ of the acquired frequency characteristic $FC_{TD}$. Then, the resonance determination unit 64 determines whether or not the obtained spectral density D' exceeds the threshold value δ(D'>δ), and determines that the robot 12 is resonating when D'>δ.

Note that the resonance determination unit 64 may obtain the difference Δ between the computed value (e.g., the amplitude value $A_n$, the integrated value INT, or the spectral density D) obtained from the frequency characteristic $FC_{WS}$ and the computed value (e.g., amplitude value $A_n'$, the integrated value INT', or the spectral density D') obtained from the frequency characteristic $FC_{TD}$.

Then, the resonance determination unit 64 determines whether or not the difference Δ exceeds a predetermined threshold value $Δ_{th}$(Δ>$Δ_{th}$), and when Δ>$Δ_{th}$, the robot 12 may be determined to be resonating. As described above, the resonance determination unit 64 determines whether or not the robot 12 is resonating by comparing the frequency characteristics $FC_{TD}$ and $FC_{WS}$ with each other.

The resonance determination unit 64 may receive the input of threshold-setting data THD for setting the threshold values $α_n$, γ, δ or $Δ_{th}$, described above. For example, the operator operates the input device 38 to input, in advance, the above-described coefficient β or threshold value $Δ_{th}$ as the threshold-setting data THD. The processor 30 receives the threshold-setting data THD and functions as the resonance determination unit 64 to set the threshold values $α_n$, γ, δ or $Δ_{th}$ in accordance with the threshold-setting data THD. That is, in this case, the processor 30 functions as a second input receiving unit 66 (FIG. 2) that receives an input of the threshold-setting data THD.

As another specific example of the resonance determination, the resonance determination unit 64 can also determine whether or not the robot 12 is resonating without acquiring the frequency characteristic $FC_{WS}$ of the weaving signal WS2. Specifically, the processor 30 functions as the resonance determination unit 64 to determine whether or not the amplitude value $A_n'$ at the frequency $f_n$ of the fundamental harmonic FM or higher harmonics $HM_n$ included in the frequency characteristic $FC_{TD}$ of the time-series data TD acquired by the frequency characteristic acquisition unit 62 exceeds a predetermined threshold value $α_n'$.

Then, the resonance determination unit 64 determines that the robot 12 is resonating when $A_n'$>$α_n'$. This threshold value $α_n'$ is predetermined by the operator based on the frequency $f_n$ of the weaving signal WS2 and stored in the memory 32 in advance. For example, the operator can set the threshold value $α_n'$ by pre-validating the frequency characteristic $FC_{WS}$ of the weaving signal WS2 using an experimental technique, or the like. In this case, the processor 30 may function as the second input receiving unit 66 and receive the input of the threshold value $α_n'$ in advance through the input device 38.

According to the above method, the resonance determination unit 64 determines whether or not the robot 12 is resonating. When the resonance determination unit 64 determines that the robot 12 is resonating, the processor 30 functions as a correction unit 68 to correct the weaving signal WS so as to change the frequency $f_n$ of the weaving signal WS.

As an example, the correction unit 68 changes the frequency $f_0$ of the fundamental harmonic FM entered as the parameter PR. Specifically, the correction unit 68 increases or decreases the frequency $f_0$ set as the parameter PR by a predetermined change amount γ, thereby changing to a frequency $f_0'$(=$f_0$+φ, or $f_0$−φ). After changing to the frequency $f_0'$, the original signal generation unit 46 generates the weaving signal WS1 with the changed frequency $f_0'$.

As a result, the frequency $f_0$ of the fundamental harmonic FM of the weaving signal WS2 generated by the filter unit 48 will also be changed to the frequency $f_0'$. Thus, the correction unit 68 corrects the weaving signals WS1 and WS2 to be generated by the weaving signal generation unit 56, by changing the frequency $f_0$ of the fundamental harmonic FM. In this case, not only the frequency $f_0$ of the fundamental harmonic FM of the weaving signal WS2 generated by the weaving signal generation unit 56, but also the frequency $f_n$ of the higher harmonic $HM_n$ can be changed.

As another example, when the resonance determination unit 64 determines that the robot 12 is resonating at the frequency $f_n$ of the higher harmonic $HM_n$ in the weaving signal WS2, the correction unit 68 may correct the weaving signal WS2, by changing the frequency $f_n$ of the higher harmonic $HM_n$. For example, it is assumed that the frequency characteristic acquisition unit 62 acquires the frequency characteristic $FC_{WS}$ and $FC_{TD}$, and the resonance determination unit 64 compares the frequency characteristic $FC_{WS}$ and $FC_{TD}$ and determines that the amplitude value $A_2'$ at the frequency $f_2$ of the higher harmonic $HM_2$ exceeds the threshold value $α_2$, as illustrated in FIG. 11.

In this case, the correction unit 68 increases or decreases, by a predetermined change amount φ with digital signal processing, the frequency $f_2$ of the higher harmonic $HM_2$ included in the frequency characteristic $FC_{WS}$ of the weaving signal WS2 acquired by the frequency characteristic acquisition unit 62, and changes the frequency to a frequency $f_2'$. The correction unit 68 then obtains frequency characteristic $FC_{WS}'$ with the harmonic $HM_2$ of the changed frequency $f_2'$, and the fundamental harmonic FM and higher harmonics $HM_1$, $HM_3$, $HM_4$ . . . of the original weaving signal WS2.

The weaving signal generation unit 56 performs an inverse Fourier transform (e.g., IFFT) of the frequency characteristic $FC_{WS}'$ obtained by the correction unit 68 to generate the corrected weaving signal WS2 and output it to the weaving operation command generation unit 54. Thus, the correction unit 68 can correct the weaving signal WS2 by changing the frequency $f_n$ of the higher harmonic $HM_n$.

Note that even when the resonance determination unit 64 determines the resonance of the robot 12 by determining whether or not the amplitude value $A_n'$ of the frequency $f_n$ of the higher harmonic $HM_n$ exceeds a predetermined threshold value $α_n'$, the correction unit 68 can correct the weaving signal WS2 by changing the frequency $f_n$ of the higher harmonic $HM_n$.

Specifically, it is assumed that the resonance determination unit 64 determines that the amplitude value $A_2'$ at the frequency $f_2$ of the higher harmonic $HM_2$ exceeds a predetermined threshold value $α_2'$, as illustrated, for example, in FIG. 11. At this time, the frequency characteristic acquisition unit 62 acquires the frequency characteristic $FC_{WS}$ of the weaving signal WS2, and the correction unit 68 increases or decreases the frequency $f_2$ of the higher harmonic $HM_2$ included in the acquired frequency characteristic $FC_{WS}$ by a predetermined change amount φ, thereby changing to a frequency $f_2'$.

The correction unit 68 then obtains frequency characteristic $FC_{WS}'$ with the higher harmonic $HM_2$ of the changed frequency $f_2'$ and the fundamental harmonic FM and higher harmonics $HM_1$, $HM_3$, $HM_4$ . . . of the original weaving signal WS2, and performs inverse Fourier transform (e.g., IFFT) to generate the corrected weaving signal WS2. Thus, the correction unit 68 can correct the weaving signal WS2 by changing the frequency $f_n$ of the higher harmonic $HM_n$.

The processor 30 functions as the first input receiving unit 44, and may receive the input of the above-described change amount φ along with the frequency $f_0$ of the fundamental harmonic FM. For example, the operator inputs the change amount φ in advance by operating the input device 38. The weaving signal generation unit 56 generates the weaving signal WS2 in accordance with the received amplitude value A and frequency $f_0$, and the correction unit 68 changes the frequency $f_n$ of the weaving signal WS in accordance with the received change amount φ when the resonance determination unit 64 determines that the robot 12 is resonating. Thus, the correction unit 68 corrects the weaving signal WS so as to change the frequency $f_n$.

Next, referring to FIG. 12, the control flow of the welding work executed by the processor 30 will be described. The flow illustrated in FIG. 12 starts when the processor 30 receives a work start command from the operator, the host controller or the work program PG. In step S1, the processor 30 starts the weaving operation.

Specifically, the processor 30 functions as the weaving signal generation unit 56 (the original signal generation unit 46, the filter unit 48), the main operation command generation unit 50, the filter unit 52, and the weaving operation command generation unit 54 as described above to generate the weaving operation command CM3 and operate the robot 12 in accordance with the weaving operation command CM3. As a result, the robot 12 starts the weaving operation.

In step S2, the processor 30 activates the tool 26 to execute the welding work. Thus, the processor 30 executes the welding work on the workpiece W by the tool 26 while performing the weaving operation started in step S1. Thus, the processor 30 functions as a tool control unit 70 (FIG. 2) that activates the tool 26 to execute the welding work. In step S3, the processor 30, functioning as the time-series data acquisition unit 60, begins to acquire the time-series data TD as described above.

In step S4, the processor 30 functions as the frequency characteristic acquisition unit 62 and starts to acquire the frequency characteristic $FC_{TD}$ of the time-series data TD as described above. For example, the frequency characteristic acquisition unit 62 acquires sequentially (e.g., with the control cycle $T_c$): the frequency characteristic $FC_{WS}$ of the weaving signal WS2 generated by the weaving signal generation unit 56; and the frequency characteristic $FC_{TD}$ of the time-series data TD acquired by the time-series data acquisition unit 60 when operating the robot 12 in accordance with the weaving signal WS2.

In step S5, the processor 30 functions as the resonance determination unit 64 to determine whether or not the robot 12 is resonating based on the frequency characteristic $FC_{TD}$ acquired in step S4, as described above. For example, the processor 30 determines whether or not the robot 12 is resonating by comparing the frequency characteristics $FC_{WS}$ and $FC_{TD}$ acquired in the most recent step S4. When determining that the robot 12 is resonating (i.e., YES), the processor 30 proceeds to step S6, but when determining NO, the processor 30 proceeds to step S7.

In step S6, the processor 30 functions as the correction unit 68 to correct the weaving signal WS so as to change the frequency $f_n$ of the weaving signal WS as described above. For example, the processor 30 changes the frequency $f_0$ (or frequency $f_n$ of the higher harmonic $HM_n$ in the weaving signal WS2) of the fundamental harmonic FM of the weaving signal WS1 to the frequency $f_0'$ by increasing or decreasing by the change amount φ. The processor 30 then functions as the weaving signal generation unit 56, generating the weaving signals WS1 and WS2 based on the changed frequency $f_0'$.

After step S6, the processor 30 returns to step S5 and repeats the loop of steps S5 and S6 until determining NO in step S5. Here, the processor 30 may change the frequency $f_n$ of the weaving signal WS by the change amount φ within a predetermined allowable range $[f_{th1}, f_{th2}]$ each time step S6 is executed.

The allowable range $[f_{th1}, f_{th2}]$ ($=f_{th1} \leq f_n' \leq f_2$) may be arbitrarily defined by the operator as the range of [3.5, 4.5] (i.e., 4 Hz±0.5 Hz) when, for example, the frequency $f_0$ of the fundamental harmonic FM is $f_0=4$ Hz. In this case, the processor 30 may function as the first input receiving unit 44 and receive inputs of the threshold values $f_{th1}$ and $f_{th2}$ that define the allowable range $[f_{th1}, f_{th2}]$ together with the change amount φ.

When the changed frequency $f_n'$ is out of the allowable range $[f_{th1}, f_{th2}]$ by executing step S6 (i.e., $f_n' < f_{th1}$, or $f_{th2} < f_n'$), an alarm signal indicating to this effect may be generated as image data (or audio data) and displayed at the display device 40 (or output through a speaker). Furthermore, the processor 30 may continue the welding work while outputting an alarm signal or may stop the welding work by outputting an alarm signal when the changed frequency $f_n'$ falls outside the allowable range $[f_{th1}, f_{th2}]$.

In step S7, the processor 30 determines whether or not the welding work is completed based on the work program PG and the feedback FB from the rotation detector 58. When determining that the welding work is completed (i.e., YES), the processor 30 functions as the tool control unit 70 to stop the operation of the tool 26 and terminate the flow illustrated in FIG. 12. On the other hand, when determining NO, the processor 30 returns to step S5.

Figure 12:
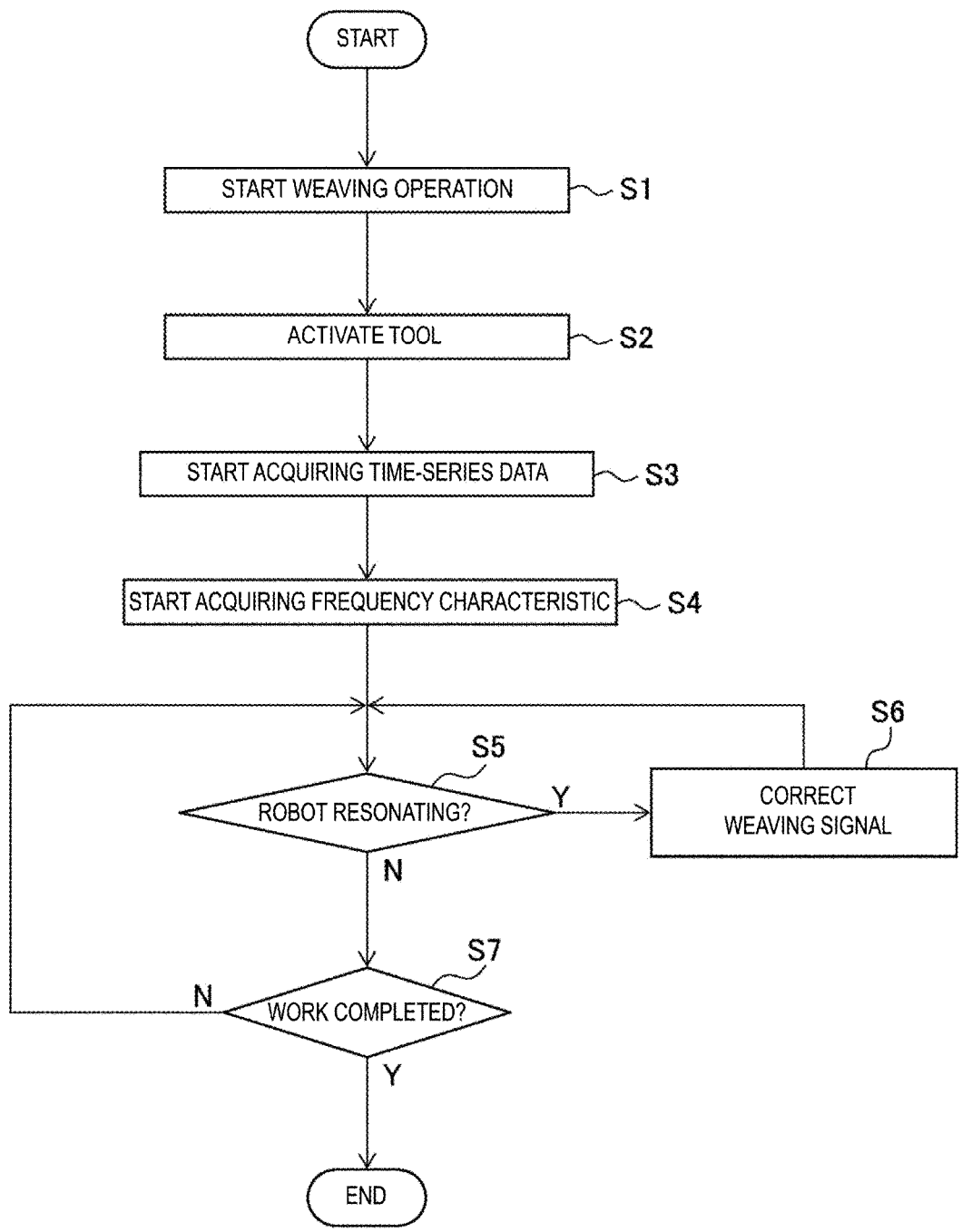
FIG. 12 is a flowchart illustrating an example of a control flow of a welding work executed by the robot system illustrated in FIG. 1.

In the flow illustrated in FIG. 12, the processor 30 may start step S1 after starting step S2. In addition, the processor 30 may randomly determine the change amount φ for changing the frequency $f_n$ each time step S6 is executed without the operator entering the change amount φ in advance.

As described above, in the present embodiment, the processor 30 functions as the first input receiving unit 44, the weaving signal generation unit 56, the time-series data acquisition unit 60, the frequency characteristic acquisition unit 62, the resonance determination unit 64, the second input receiving unit 66, the correction unit 68, and the tool control unit 70 to generate signals for the weaving operation.

Thus, the first input receiving unit 44, the weaving signal generation unit 56, the time-series data acquisition unit 60, the frequency characteristic acquisition unit 62, the resonance determination unit 64, the second input receiving unit 66, the correction unit 68, and the tool control unit 70 constitute a device 80 (FIG. 2) that generates signals for the weaving operation. That is, in the present embodiment, the device 80 is implemented in the controller 14 as a function module implemented by the processor 30 executing the work program PG.

As described above, the device 80 is provided with: the weaving signal generation unit 56 that generates weaving signals WS1 and WS2; the time-series data acquisition unit 60 that acquires the time-series data TD when the robot 12 is caused to execute the weaving operation in accordance with the weaving signal WS2; and the frequency characteristic acquisition unit 62 that acquires the frequency characteristic $FC_{TD}$ (first frequency characteristic) of the time-series data TD.

The device 80 is also provided with the resonance determination unit 64 that determines whether or not the robot 12 is resonating based on the frequency characteristic $FC_{TD}$, and the correction unit 68 that corrects the weaving signal WS1 or WS2 so as to change the frequency $f_n$ of the weaving signal WS1 or WS2 when determining that the robot 12 is resonating.

With this configuration, since the resonance generated when the tool 26 is swung in the front-back direction in the weaving operation can be suppressed, the weaving operation can be executed more stably. As a result, the accuracy of the welding work can be enhanced, thereby improving the welding quality.

Furthermore, in the device 80, the correction unit 68 corrects the weaving signals WS1 and WS2 by changing the frequency $f_0$ of the fundamental harmonic FM of the weaving signals WS1 and WS2, as an example. According to this configuration, not only the frequency $f_0$ of the fundamental harmonic FM of the weaving signal WS2 but also the frequency $f_n$ of the higher harmonic $HM_n$ can be changed as described above. Thus, even when the robot 12 resonates at any of the frequency $f_n$ of the fundamental harmonic FM or the frequency $f_n$ of the higher harmonics $HM_n$ of the weaving signal WS2, the resonance can be easily and reliably suppressed.

Additionally, in the device 80, the first input receiving unit 44 receives the input of the frequency $f_0$ of the fundamental harmonic FM, the weaving signal generation unit 56 generates the weaving signals WS1 and WS2 with the received frequency $f_0$, and the correction unit 68 corrects the weaving signals WS1 and WS2 to be generated by the weaving signal generation unit 56, by changing the received frequency $f_0$.

According to this configuration, since the operator can freely set the frequency $f_0$, a wider variety of weaving operations can be designed, and the resonance of the robot 12 caused by the frequency $f_0$ can be reliably suppressed, by changing the frequency $f_0$ set by the operator.

In addition, in the device 80, the first input receiving unit 44 further receives an input of changing the change amount φ that changes the frequency $f_n$ of the fundamental harmonic FM or the higher harmonics $HM_n$, and the correction unit 68 changes the frequency $f_n$ in accordance with the received change amount φ. With this configuration, the operator can freely determine the change amount φ so that resonance can be reliably suppressed while minimizing the effect of changing the frequency $f_n$ on the welding quality.

In the device 80, as an example, the frequency characteristic acquisition unit 62 further acquires the frequency characteristic $FC_{WS}$ (second frequency characteristic) of the weaving signal WS2 generated by the weaving signal generation unit 56, and the resonance determination unit 64 determines whether or not the robot 12 is resonating by comparing the frequency characteristics $FC_{TD}$ and $FC_{WS}$ acquired by the frequency characteristic acquisition unit 62. With this configuration, whether or not the robot 12 is resonating can be detected more accurately.

When comparing the frequency characteristics $FC_{TD}$ and $FC_{WS}$, the resonance determination unit 64 determines that the robot 12 is resonating when the amplitude value $A_n'$ (first amplitude value) of a predetermined frequency $f_n$ included in the frequency characteristic $FC_{TD}$ exceeds the threshold value $\alpha_n$ defined in response to the amplitude value $A_n$ (second amplitude value) of the predetermined frequency $f_n$ included in the predetermined frequency characteristic $FC_{WS}$. With this configuration, a relatively simple algorithm can accurately detect whether or not the robot 12 is resonating.

The second input receiving unit 66 receives an input of the threshold-setting data THD (coefficient β) for setting the threshold value $\alpha_n$, and the resonance determination unit 64 sets the threshold value $\alpha_n$ for the amplitude value $\alpha_n$ in accordance with the threshold-setting data THD. With this configuration, the operator can freely set the threshold value $\alpha_n$ for the resonance determination.

On the other hand, as another example, the resonance determination unit 64 determines that the robot 12 is resonating when the amplitude value $A_n'$ of the predetermined frequency $f_n$ included in the frequency characteristic $FC_{TD}$ of the time-series data TD obtained by the frequency characteristic acquisition unit 62 exceeds the threshold value $\alpha_n'$ which is predetermined based on the frequency $f_n$ of the weaving signal WS2.

This configuration allows a simpler algorithm to detect whether or not the robot 12 is resonating. In this case, the second input receiving unit 66 receives the input of the threshold value $\alpha_n'$. With this configuration, the operator can freely set the threshold value $\alpha_n'$ for resonance determination.

According to the device 80, in the flow illustrated in FIG. 12, the weaving signal generation unit 56 generates the weaving signals WS1 and WS2 while the tool control unit 70 executes the welding work (step S2), and the time-series data acquisition unit 60 acquires the time-series data TD when the weaving operation is executed in accordance with the weaving signals WS1 and WS2 generated when the welding work is executed (step S3).

Then, the resonance determination unit 64 determines (step S5) whether or not the robot 12 is resonating based on the frequency characteristic $FC_{TD}$ (step S4) acquired by the frequency characteristic acquisition unit 62 during the execution of the welding work, and the correction unit 68 corrects the weaving signals WS1 and WS2 when determining that the robot 12 is resonating during the execution of the welding work (step S6). According to this configuration, the presence or absence of resonance of the robot 12 can be monitored in real time while the welding work is actually executed, and when the resonance occurs, the weaving signal WS can be corrected in real time.

Figure 13:
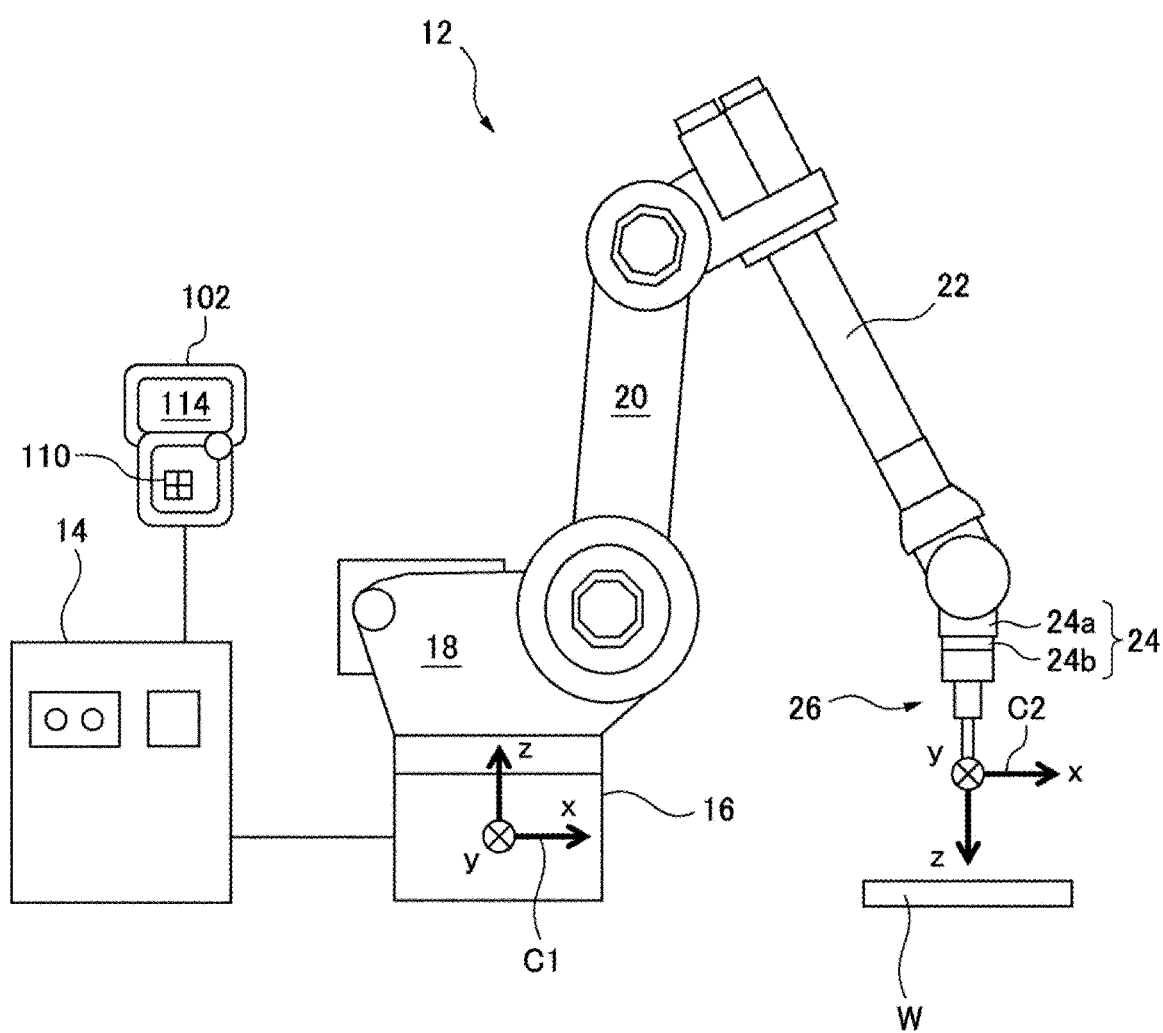
FIG. 13 is a diagram of a robot system according to another embodiment.
Figure 14:
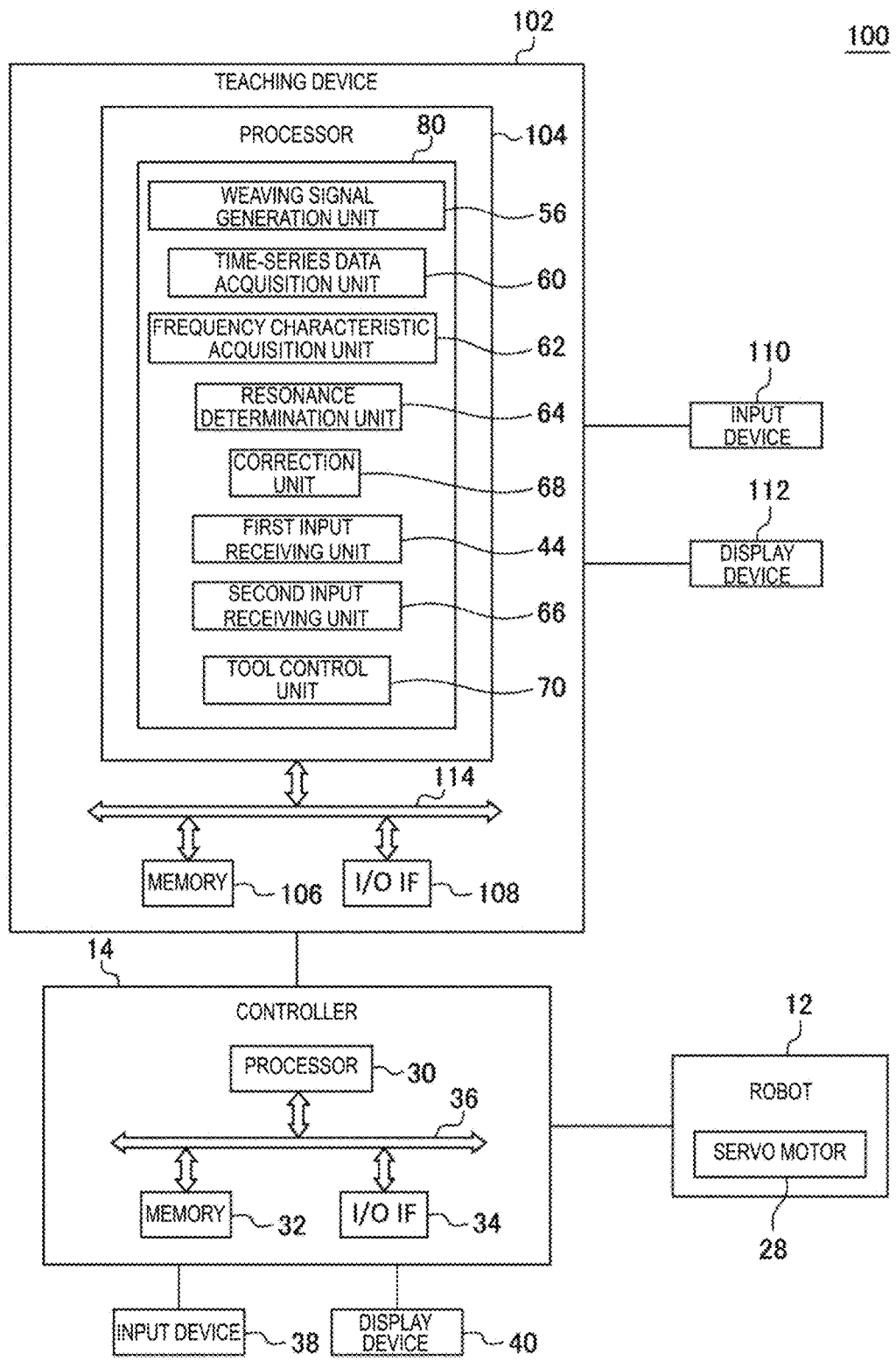
FIG. 14 is a block diagram of the robot system illustrated in FIG. 13.

Before actually executing the welding work (e.g., when teaching the weaving operation to the robot 12), the occurrence of resonance of the robot 12 and the operation to correct the weaving signal WS can be verified. A robot system 100 that executes such functions will be described below with reference to FIG. 13 and FIG. 14.

The robot system 100 differs from the robot system 10 described above in that the robot system 100 further includes a teaching device 102. The teaching device 102 teaches the weaving operation to the robot 12. Specifically, the teaching device 102 is a portable computer, for example, a teaching pendant or a tablet-type terminal device, and includes a processor 104, a memory 106, and an I/O interface 108. The teaching device 102 is provided with an input device 110 and a display device 112.

Note that since the configuration and functions of the processor 104, the memory 106, the I/O interface 108, the input device 110, and display device 112 are the same as those of the processor 30, memory 32, the I/O interface 34, the input device 38, and the display device 40 described above, overlapping descriptions are omitted. The processor 104 is communicably connected to the memory 106 and the I/O interface 108 via a bus 114, and performs arithmetic processing to execute the teaching function described later while communicating with these components.

In the present embodiment, the functions of the device 80 (the first input receiving unit 44, the weaving signal generation unit 56, the time-series data acquisition unit 60, the frequency characteristic acquisition unit 62, the resonance determination unit 64, the second input receiving unit 66, the correction unit 68, and the tool control unit 70) are implemented at the teaching device 102, and the processor 104 of the teaching device 102 functions as the device 80.

The processor 104 is configured to send a command to each servo motor 28 of the robot 12 via the controller 14 in response to the input data to the input device 110, and to allow the robot 12 to jog in accordance with the command. The operator causes the robot 12 to jog by operating the input device 110 and instructs the weaving operation to the robot 12.

Specifically, the operator operates the input device 110 to teach the robot 12 a plurality of teaching points TP to move the tool 26 (TCP) in the direction of the work path WP. On the other hand, the operator operates the input device 110 to input the parameter PR (the amplitude value A, the frequency $f_0$, or the like) of the weaving signal WS.

The processor 104 acquires the coordinates of the teaching point TP in the robot coordinate system C1 and also functions as the first input receiving unit 44 to receive the input of the parameter PR. The processor 104 then generates a work program PG1 based on the acquired teaching points TP and the parameter PR. In this work program PG1, the coordinates of the teaching points TP and the parameter PR are specified as instruction codes. In this way, the teaching device 102 teaches the robot 12 the weaving operation and generates the work program PG1 for the welding work.

Figure 15:
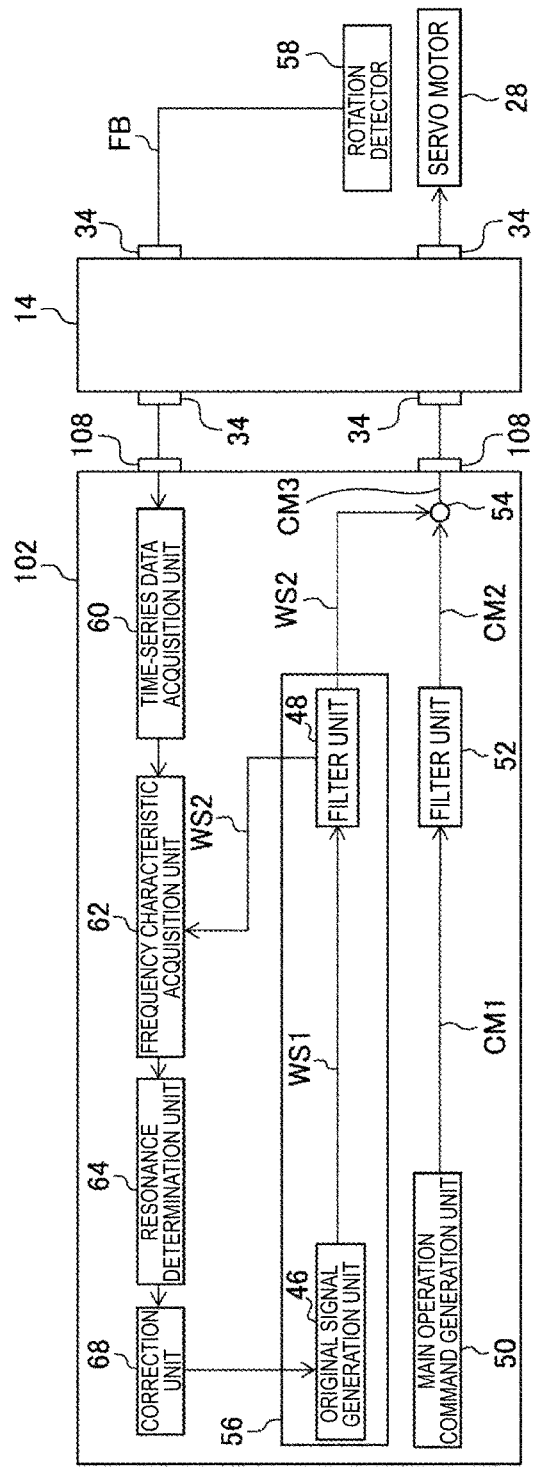
FIG. 15 is a block diagram of a function of generating a weaving operation command in a teaching device illustrated in FIG. 13.

The operator causes the robot 12 to try the weaving operation in accordance with the work program PG1 generated to verify whether or not the robot 12 resonates. FIG. 15 illustrates a block diagram representing the function to generate the weaving signal WS at the teaching device 102. The operator operates the input device 110 to give a work start command to the processor 104.

In response to the work start command, the processor 104 functions as the weaving signal generation unit 56 to generate the weaving signal WS, similar to the above-described embodiment. Specifically, the processor 104 functions as the original signal generation unit 46 to generate the weaving signal WS1 in accordance with the parameter PR specified in the work program PG1, and functions as the filter unit 48 to generate the weaving signal WS2 by performing the filter processing FR1 on the weaving signal WS1 generated by the original signal generation unit 46.

Furthermore, the processor 104 functions as the main operation command generation unit 50 to generate the main operation command CM1 in accordance with the teaching points TP specified in the work program PG1, and functions as the filter unit 52 to generate the main operation command CM2 by performing the filter processing FR2 on the main operation command CM1 generated by the main operation command generation unit 50, as in the above embodiment.

The processor 104 then functions as the weaving operation command generation unit 54, generates the weaving operation command CM3 by applying the weaving signal WS2 to the main operation command CM2, and sends the weaving operation command CM3 to the servo motor 28 of the robot 12 via the I/O interface 108 and the controller 14. Thus, the processor 104 controls the robot 12 in accordance with the weaving operation command CM3 via the controller 14 to execute the weaving operation.

Here, in the present embodiment, while the robot 12 executes the weaving operation, the processor 104 functions as the tool control unit 70 to stop the operation of the tool 26. Thus, with the tool 26 stopped (i.e., without executing the welding work), the robot 12 will perform the weaving operation to move the tool 26 along the trajectory TR as illustrated in FIG. 3.

While the robot 12 executes the weaving operation, the rotation detector 58 continuously detects the rotation of the servo motor 28 and supplies the detected rotation as the position feedback FB to the teaching device 102 via the controller 14, as in the above-described embodiment. The processor 104 then functions as the time-series data acquisition unit 60, the frequency characteristic acquisition unit 62, and the resonance determination unit 64, as in the above-described embodiment, to determine whether or not the robot 12 is resonating.

Thus, the operator can verify whether or not the robot 12 resonates when the robot 12 is caused to execute the weaving operation in accordance with the work program PG1. The operator can then identify the frequency $f_n$ with which the robot 12 resonates when the occurrence of resonance is detected.

When the resonance of the robot 12 is detected, the operator operates the input device 110 to input the above-described change amount φ. The processor 104 functions as the first input receiving unit 44 to receive the input of change amount φ, and functions as the correction unit 68 to correct the weaving signals WS1 and WS2 by changing the frequency $f_n$ (e.g., the frequency $f_0'$ of the fundamental harmonic FM) in accordance with the change amount φ.

Then, the weaving signal generation unit 56 generates the corrected weaving signal WS2, and the resonance determination unit 64 determines whether or not the resonance of the robot 12 occurs again when the robot 12 is caused to execute the weaving operation in accordance with the corrected weaving signal WS2. By repeating the above trial process, the operator can acquire the optimum change amount φ that can suppress the resonance of the robot 12.

Then, in response to the input data from the operator, the processor 104 generates a work program PG2, in which a statement for changing the frequency $f_n$ specified in a work program PG1 as the parameter PR by change amount φ is specified. For example, the processor 104 changes the frequency $f_0$ of the fundamental harmonic FM specified in the work program PG1 by the change amount φ, and generates the work program PG2 in which the changed frequency $f_0'$ is specified as a statement.

The processor 104 supplies the generated work program PG2 to the controller 14. The processor 30 of the controller 14 operates the robot 12 in accordance with the work program PG2 to execute the actual welding work on the workpiece W. Here, in accordance with the work program PG2, the frequency $f_n$ that caused the resonance is changed to the frequency $f_n'$, so that even when the robot 12 is caused to execute the weaving operation in accordance with the work program PG2, the robot 12 does not resonate. Thus, work quality can be improved.

As described above, in the present embodiment, the weaving signal generation unit 56 generates the weaving signals WS1 and WS2 when the tool control unit 70 stops the tool 26, and the time-series data acquisition unit 60 obtains the time-series data TD when the weaving operation is executed in accordance with the weaving signal WS2 generated during stopping the tool 26.

The resonance determination unit 64 then determines whether or not the robot 12 is resonating based on the frequency characteristic $FC_{TD}$ acquired during stopping the tool 26. Thus, by verifying the resonance of the robot 12 at the stage of teaching the weaving operation to the robot 12 without operating the tool 26, it is possible to reliably suppress the occurrence of the resonance during the actual welding work and improve the work quality.

The resonance determination unit 64 may determine whether or not the robot 12 is resonating by applying the frequency characteristic $FC_{TD}$ acquired by the frequency characteristic acquisition unit 62 to a learning model LM constructed by machine learning. This learning model LM represents the correlation between the frequency characteristic $FC_{TD}$ and the resonance generated at the robot 12.

The learning model LM can be constructed by repeatedly feeding the machine learning device a learning data set of, for example, the frequency characteristic $FC_{TD}$ acquired when the robot 12 is caused to execute the weaving operation in accordance with the weaving signal WS of various parameters PR and the determination data representing the presence or absence of resonance at that time (e.g., supervised learning). The learning model LM is stored in the memory 32 or 106 in advance.

The resonance determination unit 64 sequentially inputs the frequency characteristic $FC_{TD}$ acquired by the frequency characteristic acquisition unit 62 during the weaving operation into the learning model LM. The learning model LM determines the presence or absence of resonance from the input frequency characteristic $FC_{TD}$. Thus, the resonance determination unit 64 can determine with high accuracy whether or not the robot 12 is resonating by using the frequency characteristic $FC_{TD}$ and the learning model LM.

When the frequency characteristic $FC_{TD}$ is input, the learning model LM may determine the presence or absence of resonance and output an optimal change amount φ when determining that resonance is occurring. Such a learning model LM indicates the correlation of the frequency characteristic $FC_{TD}$, resonance occurring at the robot 12 and the change amount φ, and can be constructed by repeatedly feeding the machine learning apparatus with learning data sets of various frequency characteristics $FC_{TD}$, determination data representing the presence or absence of resonance at that time, and the change amount φ associated with the determination data representing the occurrence of resonance.

In this case, when the frequency characteristic $FC_{TD}$ acquired during the weaving operation by the resonance determination unit 64 is input, the learning model LM determines the presence or absence of resonance, and when determining that resonance is occurring, outputs a change amount φ having a high correlation with the input frequency characteristic $FC_{TD}$. The correction unit 68 then corrects the weaving signal WS by changing the frequency $f_n$ in accordance with the change amount φ output by the learning model LM. With this configuration, the weaving signal WS can be corrected with the optimal change amount q obtained by machine learning when the resonance occurs at the robot 12.

In the weaving operation, the processor 30 or 104 may swing the tool 26 in the up-down direction in synchronization with swinging the tool 26 in the front-back direction. Such a weaving operation will be described with reference to FIG. 3 and FIG. 16. In the example illustrated in FIG. 16, the processor 30 swings the tool 26 in the front-back direction and swings the tool 26 in the up-down direction so as to be displaced upward by a distance 8 at the position of the work path WP.

Figure 17:
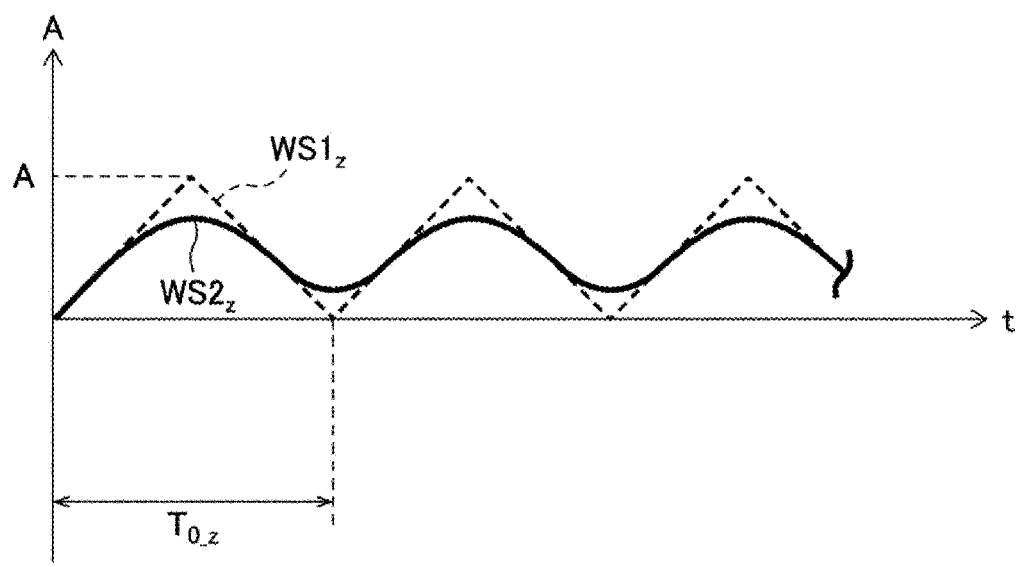
FIG. 17 illustrates a waveform of a weaving signal for the robot to execute the weaving operation in the trajectory illustrated in FIG. 16.

FIG. 17 illustrates weaving signals $WS1_z$ and $WS2_z$ to be generated by the weaving signal generation unit 56 to cause the robot 12 to execute the weaving operation in the up-down direction illustrated in FIG. 16. The vertical axis in FIG. 17 illustrates the amplitude A, which swings the tool 26 in the up-down direction, and the horizontal axis illustrates time t. A weaving signal $WS1_z$ illustrated in FIG. 17 has the amplitude A and a frequency $f_{0\_z}$ ($=1/T_{0\_z}$) as the parameter PR.

As in the above embodiment, the original signal generation unit 46 generates the weaving signal $WS1_z$, and the filter unit 48 generates a weaving signal $WS2_z$ by executing the filter processing FR1 on the weaving signal $WS1_z$. When the tool 26 is swung vertically on the robot 12 in accordance with this weaving signal $WS2_z$, the robot 12 can resonate at a frequency $f_{n\_z}$ of the weaving signal $WS2_z$.

The processor 30 or 104 functions as the time-series data acquisition unit 60, the frequency characteristic acquisition unit 62, and the resonance determination unit 64 to determine the presence or absence of resonance at such a robot 12 by a method similar to the above-described embodiment, and when determining that the resonance is occurring, the weaving signal $WS1_z$ or $WS2_z$ can be corrected to change the frequency $f_{n\_z}$.

In the above embodiment, the case in which the processor 30 or 104 determines the presence or absence of resonance of the robot 12 and corrects the weaving signal WS when the robot 12 of the actual machine is caused to execute the weaving operation, is described (so-called online). However, without being limited thereto, the processor 30 or 104 may function as the device 80 to execute a simulation to simulate the weaving operation of the robot 12 in a virtual space, and in the simulation, the presence or absence of resonance of the robot 12 and the correction of the weaving signal WS may be executed in a simulated manner (so-called offline).

In the above embodiment, the functions of the device 80 are implemented in either the controller 14 or the teaching device 102. However, without being limited thereto, the functions of the device 80 may be implemented in both the controller 14 and the teaching device 102. That is, in this case, a device 80A (the first input receiving unit 44, the weaving signal generation unit 56, the time-series data acquisition unit 60, the frequency characteristic acquisition unit 62, the resonance determination unit 64, the second input receiving unit 66, the correction unit 68, and the tool control unit 70) is implemented in the controller 14. And a device 80B (the first input receiving unit 44, the weaving signal generation unit 56, the time-series data acquisition unit 60, the frequency characteristic acquisition unit 62, the resonance determination unit 64, the second input receiving unit 66, the correction unit 68, and the tool control unit 70) is implemented in the teaching device 102.

Alternatively, some of the functions of the device 80 (e.g., the correction unit 68 and the tool control unit 70) may be implemented in the controller 14, while the other of the functions of the device 80 (e.g., the first input receiving unit 44, the weaving signal generation unit 56, the time-series data acquisition unit 60, the frequency characteristic acquisition unit 62, the resonance determination unit 64, and the second input receiving unit 66) may be implemented in the teaching device 102.

In addition, the functions of the device 80 may be implemented in any other computer (such as a desktop-type PC) communicatively connected to the controller 14 or the teaching device 102. In this case, the processor of the other computer may function as the device 80 and control the robot 12 via the controller 14 to execute the weaving operation.

In the above embodiment, the case in which the tool 26 is a welding torch and the welding work is executed on the workpiece W, is described. However, without being limited thereto, the tool 26 may be configured to execute a brazing work on the workpiece W by, for example, melting brazing material fed from a brazing feed device (not illustrated), or execute any work on the workpiece W.

The robot 12 is not limited to the vertical articulated robot, but may be any type of robot that can move the tool 26, for example, a horizontal articulated robot, a parallel link type robot, or the like. Although the present disclosure is described through the embodiments, the above-described embodiments do not limit the invention claimed in the claims. Although the present disclosure is described through the embodiments, the above-described embodiments do not limit the invention claimed in the claims.

REFERENCE SIGNS LIST 10, 100 Robot system
12 Robot
14 Controller
26 Tool
30, 104 Processor
44, 66 Input receiving unit
56 Weaving signal generation unit
60 Time-series data acquisition unit
62 Frequency characteristic acquisition unit
64 Resonance determination unit
68 Correction unit
70 Tool control unit
80 Device
102 Teaching device

The invention claimed is:

1. A device configured to generate a signal for a weaving operation to move a tool along a predetermined work path by a robot along with swinging the tool in a direction intersecting with the work path, the device comprising:
 a weaving signal generation unit configured to generate a weaving signal for causing the robot to swing the tool;
 a time-series data acquisition unit configured to acquire time-series data of an amplitude value of the tool in the direction when the robot is caused to execute the weaving operation in accordance with the weaving signal generated by the weaving signal generation unit;
 a frequency characteristic acquisition unit configured to acquire a first frequency characteristic of the time-series data acquired by the time-series data acquisition unit;
 a resonance determination unit configured to determine whether or not the robot is resonating at a frequency of the weaving signal generated by the weaving signal generation unit, based on the first frequency characteristic acquired by the frequency characteristic acquisition unit; and
 a correction unit configured to correct the weaving signal so as to change the frequency when the resonance determination unit determines that the robot is resonating.

2. The device of claim 1, wherein the correction unit is configured to correct the weaving signal by changing the frequency of a fundamental harmonic of the weaving signal.

3. The device of claim 2, further comprising a first input receiving unit configured to receive an input of the frequency of the fundamental harmonic,
 wherein the weaving signal generation unit is configured to generate the weaving signal having the frequency received by the first input receiving unit, and
 wherein the correction unit is configured to correct the weaving signal to be generated by the weaving signal generation unit, by changing the frequency received by the first input receiving unit.

4. The device of claim 3, wherein the first input receiving unit is configured to further receive an input of a change amount by which the frequency is to be changed, and
 wherein the correction unit is configured to change the frequency in accordance with the change amount received by the first input receiving unit.

5. The device of claim 1, wherein the frequency characteristic acquisition unit is configured to further acquire a second frequency characteristic of the weaving signal generated by the weaving signal generation unit, and
 wherein the resonance determination unit is configured to determine whether or not the robot is resonating by comparing the first frequency characteristic and the second frequency characteristic acquired by the frequency characteristic acquisition unit.

6. The device of claim 5, wherein the resonance determination unit is configured to determine that the robot is resonating when a first amplitude value of a predetermined frequency included in the first frequency characteristic exceeds a threshold value which is determined in response to a second amplitude value of the predetermined frequency included in the second frequency characteristic.

7. The device of claim 6, further comprising a second input receiving unit configured to receive an input of threshold-setting data for setting the threshold value,
 wherein the resonance determination unit is configured to set the threshold value for the second amplitude value in accordance with the threshold-setting data received by the second input receiving unit.

8. The device of claim 1, wherein the resonance determination unit is configured to determine that the robot is resonating when a first amplitude value of a predetermined frequency included in the first frequency characteristic acquired by the frequency characteristic acquisition unit exceeds a threshold value which is predetermined based on the frequency of the weaving signal.

9. The device of claim 8, further comprising a second input receiving unit configured to receive an input of the threshold value.

10. The device of claim 1, further comprising a tool control unit configured to activate the tool to execute a predetermined work,
 wherein the weaving signal generation unit is configured to generate the weaving signal when the tool control unit stops the tool,
 wherein the time-series data acquisition unit is configured to acquire the time-series data when the weaving operation is executed in accordance with the weaving signal generated by the weaving signal generation unit during stopping the tool, and wherein the resonance determination unit is configured to determine whether or not the robot is resonating, based on the first frequency characteristic acquired by the frequency characteristic acquisition unit during stopping the tool.

11. The device of claim 1, further comprising a tool control unit configured to activate the tool to execute a predetermined work,
   wherein the weaving signal generation unit is configured to generate the weaving signal while the tool control unit executes the predetermined work,
   wherein the time-series data acquisition unit is configured to acquire the time-series data when the weaving operation is executed in accordance with the weaving signal generated by the weaving signal generation unit during execution of the predetermined work,
   wherein the resonance determination unit is configured to determine whether or not the robot is resonating, based on the first frequency characteristic acquired by the frequency characteristic acquisition unit during the execution of the predetermined work, and
   wherein the correction unit is configured to correct the weaving signal when the resonance determination unit determines that the robot is resonating during the execution of the predetermined work.

12. A controller comprising the device of claim 1, wherein the controller controls the robot so as to execute the weaving operation.

13. A method of generating a signal for a weaving operation to move a tool along a predetermined work path by a robot along with swinging the tool in a direction intersecting with the work path, the method comprising:
   generating, by a processor, a weaving signal for causing the robot to swing the tool;
   acquiring, by the processor, time-series data of an amplitude value of the tool in the direction when the robot is caused to execute the weaving operation in accordance with the generated weaving signal;
   acquiring, by the processor, a first frequency characteristic of the acquired time-series data;
   determining, by the processor, whether or not the robot is resonating at a frequency of the generated weaving signal, based on the acquired first frequency characteristic; and
   correcting, by the processor, the weaving signal so as to change the frequency when determining that the robot is resonating.

* * * * *